US008083064B2

(12) United States Patent
Boswell et al.

(10) Patent No.: US 8,083,064 B2
(45) Date of Patent: Dec. 27, 2011

(54) SUSTAINABLE PACKAGING FOR CONSUMER PRODUCTS

(75) Inventors: Emily Charlotte Boswell, Cincinnati, OH (US); Dimitris Ioannis Collias, Mason, OH (US); Robert Earl Magness, Lebanon, OH (US); Dean Arthur Zimmerman, West Chester, OH (US); John Moncrief Layman, Liberty Township, OH (US); John Andrew McDaniel, Middletown, OH (US); Holly Balasubramanian Rauckhorst, Fort Thomas, KY (US); Andrew Benjamin Watson, West Chester, OH (US); Anthony James Burns, Liberty Township, OH (US); Brandon Matthew Dunphy, Cincinnati, OH (US); Andrew Eric Neltner, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/013,302

(22) Filed: Jan. 25, 2011

(65) Prior Publication Data

US 2011/0120902 A1   May 26, 2011

(51) Int. Cl.
  *B65D 85/84*  (2006.01)
(52) U.S. Cl. .................... 206/524.1; 428/35.7
(58) Field of Classification Search .............. 206/524.1, 206/524.3, 524.6, 459.1, 459.5, 525; 428/34.1, 428/35.7
See application file for complete search history.

(56) References Cited

U.S. PATENT DOCUMENTS

| 3,885,155 | A | 5/1975 | Anbar |
| 4,427,884 | A | 1/1984 | Anbar et al. |
| 4,536,584 | A | 8/1985 | Eskamani et al. |
| 4,973,841 | A | 11/1990 | Purser |
| 5,438,194 | A | 8/1995 | Koudijs et al. |
| 5,661,299 | A | 8/1997 | Purser |
| 6,474,499 | B2 * | 11/2002 | Donelson et al. ........ 220/592.21 |
| 2002/0079692 | A1 * | 6/2002 | Pennaz ........................ 283/81 |
| 2005/0272134 | A1 | 12/2005 | Hughes |
| 2007/0219521 | A1 | 9/2007 | Hird et al. |
| 2009/0120825 | A1 * | 5/2009 | Ruman et al. ................ 206/440 |
| 2009/0325853 | A1 | 12/2009 | Fenyvesi et al. |
| 2010/0028512 | A1 * | 2/2010 | Kriegel et al. ............... 426/397 |
| 2010/0120943 | A1 * | 5/2010 | Narayan et al. .............. 523/128 |
| 2010/0155396 | A1 * | 6/2010 | Warner ....................... 220/4.24 |
| 2010/0273017 | A1 * | 10/2010 | Files ........................... 428/513 |
| 2011/0056906 | A1 * | 3/2011 | Meadows et al. ............ 215/316 |

FOREIGN PATENT DOCUMENTS

| WO | WO 2007/109128 | 9/2007 |
| WO | WO 2009/079213 | 6/2009 |
| WO | WO 2009/155086 | 12/2009 |

OTHER PUBLICATIONS

A. Gandini, et al., "The Furan Counterpart of Poly(ethylene terephthalate): An Alternative Material Based on Renewable Resources," *J. Polym. Sci. Part A: Polym. Chem.*, 47:295-298 (2009).
B. G. Hermann, et al., "Twisting Biomaterials Around Your Little Finger: Environmental Impacts of Bio-Based Wrappings," *Int. J. Life Cycle Assess*, 15:346-358 (2010).
M. Stuiver, et al., "Discussion: Reporting of $^{14}C$ Data," *Radiocarbon*, 19(3):355-363 (1977).
A. K. Suresh, et al. "Engineering Aspects of Industrial Liquid-Phase Air Oxidation of Hydrocarbons," *Ind. Eng. Chem. Res.*, 39(11):3958-3997 (2000).

* cited by examiner

*Primary Examiner* — Jacob K Ackun
(74) *Attorney, Agent, or Firm* — Marshall, Gerstein & Borun LLP

(57) ABSTRACT

Disclosed herein is a sustainable article substantially free of virgin petroleum-based compounds that includes a container, a cap, and a label, each made from renewable and/or recycled materials. The article has a shelf life of at least two years, and is itself entirely recyclable. The container can include polyethylene, polyethylene terephthalate, or polypropylene. The cap can include polypropylene or polyethylene. The label can include polyethylene, polyethylene terephthalate, polypropylene, or paper.

35 Claims, No Drawings

SUSTAINABLE PACKAGING FOR CONSUMER PRODUCTS

FIELD OF THE INVENTION

The present invention relates to a sustainable article substantially free of virgin petroleum-based compounds. The article includes a container, a cap, and a label, each made from a renewable material, a recycled material, a regrind material, or a mixture thereof. The article has a shelf life of at least two years, and is entirely recyclable according to typical recycling systems.

BACKGROUND OF THE INVENTION

Plastic packaging uses nearly 40% of all polymers, a substantial share of which is used for consumer products, such as personal care packages (e.g., shampoo, conditioner, and soap bottles) and household packages (e.g., for laundry detergent and cleaning compositions). Most of the materials used to produce polymers for plastic packaging applications, such as polyethylene, polyethylene terephthalate, and polypropylene, are derived from monomers (e.g., ethylene, propylene, terephthalic acid, ethylene glycol), which are obtained from non-renewable, fossil-based resources, such as petroleum, natural gas, and coal. Thus, the price and availability of the petroleum, natural gas, and coal feedstock ultimately have a significant impact on the price of polymers used for plastic packaging materials. As the worldwide price of petroleum, natural gas, and/or coal escalates, so does the price of plastic packaging materials. Furthermore, many consumers display an aversion to purchasing products that are derived from petrochemicals. In some instances, consumers are hesitant to purchase products made from limited non-renewable resources (e.g., petroleum, natural gas and coal). Other consumers may have adverse perceptions about products derived from petrochemicals as being "unnatural" or not environmentally friendly.

In response, producers of plastic packages have begun to use polymers derived from renewable resources to produce parts of their packages. For example, polyethylene terephthalate (PET) that is about 30% renewable (i.e., 30% of the monomers used to form PET, such as ethylene glycol, are derived from renewable resources) has been used for the formation of soft drink bottles. Further, polylactic acid (PLA) derived from corn has been used for plastic packaging purposes. Although containers made from PLA are biodegradable and environmentally friendly, they are currently unfit for long-term preservation because of their sensitivity to heat, shock, and moisture. Packages derived from PLA also tend to shrivel up, shrink, and often break down when exposed to household chemicals, such as bleach and alcohol ethoxylate (i.e., the active ingredient in Mr. Clean®), when the PLA is in direct contact with the product. Parts of food packaging and containers used to hold personal care products have also been formed from polyethylene derived from a renewable resource.

Although the current plastic packaging in the art can be partially composed of polymers derived from renewable materials, this current packaging contains at least one component (e.g., container, cap, label) that includes at least some virgin petroleum-based material, such as polyethylene, polyethylene terephthalate, or polypropylene. None of the current plastic packaging is substantially free of virgin petroleum-based compounds, 100% sustainable, and 100% recyclable, while having a shelf life of at least two years.

Current plastic packaging also can face difficulties during recycling. In the first few steps of a typical recycling procedure, a commonly used floatation process is used to separate polymers in a mixture based on density. Polymers that are more dense than water, such as polyethylene terephthalate, sink to the bottom of a solution, while polymers that are less dense than water, such as polyethylene and polypropylene, rise to the top of the solution. Contamination issues frequently occur during recycling because current plastic packaging that is highly filled or that is composed of some renewable materials often contains dense materials that sink during the floatation process and contaminate the polyethylene terephthalate stream (e.g., polylactic acid, highly filled high density polyethylene, or highly filled polypropylene). The polyethylene terephthalate stream is very sensitive to contamination, while the polyethylene stream is typically more robust.

Accordingly, it would be desirable to provide plastic packaging that is substantially free of virgin petroleum-based compounds, 100% sustainable, 100% recyclable, has a long-lasting shelf life, and that can minimize or eliminate contamination during recycling.

SUMMARY OF THE INVENTION

The invention relates to a recyclable, article made from sustainable materials. The article has a shelf life of at least two years and is substantially free of virgin petroleum-based compounds.

In one aspect, the article includes a container that is composed of at least about 10 wt. %, preferably at least about 25 wt. %, more preferably at least about 50 wt. %, even more preferably at least about 75 wt. %, for example, at least about 90 wt. % or about 100 wt. % of high density polyethylene (HDPE), based on the total weight of the container, which has a biobased content of at least about 95%, preferably at least about 97%, more preferably at least about 99%, for example, about 100%; and a polymer selected from the group consisting of post-consumer recycled polyethylene (PCR-PE), post-industrial recycled polyethylene (PIR-PE), regrind polyethylene, and a mixture thereof. The container has a density of less than about 1 g/mL.

The article of this aspect of the invention further includes a cap. In some embodiments, the cap is composed of a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); and a mixture thereof. In alternative embodiments, the cap is composed of a polymer selected from the group consisting of linear low density polyethylene (LLDPE) that has a biobased content of at least about 90%, preferably at least about 93%, more preferably at least about 95%, for example, about 100%; post-consumer recycled LLDPE; post-industrial recycled LLDPE; high density polyethylene (HDPE) that has a biobased content of at least about 95%, preferably at least about 97%, more preferably at least about 99%, for example, about 100%; post-consumer recycled HDPE; post-industrial recycled HDPE; low density polyethylene (LDPE) that has a biobased content of at least about 90%, preferably at least about 93%, more preferably at least about 95%, for example, about 100%; post-consumer recycled LDPE; post-industrial recycled LDPE; and a mixture thereof. The cap has a density of less than about 1 g/mL.

Still further, the article of this aspect of the invention includes a label that is composed of ink (e.g., soy-based, plant-based, or a mixture thereof) and a substrate that includes a polymer selected from the group consisting of polyethylene that has a biobased content of at least about 90%, preferably at least about 93%, more preferably at least about 95%, for example, about 100%; post-consumer recycled polyethylene (PCR-PE); post-industrial recycled polyethylene (PIR-PE); paper; and a mixture thereof. In alternative embodiments, the substrate includes a polymer selected from the group consisting of polyethylene terephthalate that has a biobased content of at least about 90%, preferably at least about 93%, more preferably at least about 95%, for example, about 100%; post-consumer recycled polyethylene terephthalate (PCR-PET); post-industrial recycled polyethylene terephthalate (PIR-PET); a polyester of furan dicarboxylic acid having a biobased content of at least about 90%, preferably at least about 93%, more preferably at least about 95%, for example, about 100%; a post-consumer recycled polyester of furan dicarboxylic acid; a post-industrial recycled polyester of furan dicarboxylic acid; a regrind polyester of furan dicarboxylic acid; paper; and a mixture thereof. In other alternative embodiments, the substrate includes a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); paper; and a mixture thereof. When the label is composed of polyethylene or polypropylene, it has a density of less than about 1 g/mL. When the label is composed of polyethylene terephthalate, a polyester of furan dicarboxylic acid, or a mixture thereof, it has a density of greater than about 1 g/mL.

In another aspect, the article includes a container that is composed of at least about 10 wt. %, preferably at least about 25 wt. %, more preferably at least about 50 wt. %, even more preferably at least about 75 wt. %, for example, at least about 90 wt. % or about 100 wt. % of polyethylene terephthalate (PET) or a polyester of furan dicarboxylic acid (e.g., polyethylene 2,5-furandicarboxylate (PEF)), based on the total weight of the container, which has a biobased content of at least about 90%, preferably at least about 93%, more preferably at least about 95%, for example, about 100%. In embodiments when the container includes PET with a biobased content of at least about 90%, the container further includes a polymer selected from the group consisting of post-consumer recycled polyethylene terephthalate (PCR-PET); post-industrial recycled polyethylene terephthalate (PIR-PET); regrind polyethylene terephthalate; and a mixture thereof. In embodiments when the container includes a polyester of furan dicarboxylic acid with a biobased content of at least about 90%, the container further includes a polymer selected from the group consisting of a post-consumer recycled polyester of furan dicarboxylic acid, a post-industrial recycled polyester of furan dicarboxylic acid, a regrind polyester of furan dicarboxylic acid, and a mixture thereof. The container has a density of greater than about 1 g/mL.

The article of this aspect of the invention further includes a cap. In some embodiments, the cap is composed of a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); and a mixture thereof. In alternative embodiments, the cap is composed of a polymer selected from the group consisting of linear low density polyethylene (LLDPE) that has a biobased content of at least about 90%, preferably at least about 93%, more preferably at least about 95%, for example, about 100%; post-consumer recycled LLDPE; post-industrial recycled LLDPE; high density polyethylene (HDPE) that has a biobased content of at least about 95%, preferably at least about 97%, more preferably at least about 99%, for example, about 100%; post-consumer recycled HDPE; post-industrial recycled HDPE; low density polyethylene (LDPE) that has a biobased content of at least about 90%, preferably at least about 93%, more preferably at least about 95%, for example, about 100%; post-consumer recycled LDPE; post-industrial recycled LDPE; and a mixture thereof. The cap has a density of less than about 1 g/mL.

Still further, the article of this aspect of the invention includes a label that is composed of ink (e.g., soy-based, plant-based, or a mixture thereof) and a substrate that includes a polymer selected from the group consisting of polyethylene terephthalate that has a biobased content of at least about 90%, preferably at least about 93%, more preferably at least about 95%, for example, about 100%; post-consumer recycled polyethylene terephthalate (PET); post-industrial recycled PET; regrind PET; a polyester of furan dicarboxylic acid having a biobased content of at least about 90%, preferably at least about 93%, more preferably at least about 95%, for example, about 100%; a post-consumer recycled polyester of furan dicarboxylic acid; a post-industrial recycled polyester of furan dicarboxylic acid; a regrind polyester of furan dicarboxylic acid; paper; and a mixture thereof; and ink (e.g., soy-based, plant-based, or a mixture thereof). In alternative embodiments, the substrate includes a polymer selected from the group consisting of polyethylene that has a biobased content of at least about 90%, preferably at least about 93%, more preferably at least about 95%, for example, about 100%; post-consumer recycled polyethylene (PCR-PE); post-industrial recycled polyethylene (PIR-PE); paper; and a mixture thereof. In other alternative embodiments, the substrate includes a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); paper; and a mixture thereof. When the label is composed of polyethylene or polypropylene, it has a density of less than about 1 g/mL. When the label is composed of polyethylene terephthalate, a polyester of furan dicarboxylic acid, or a mixture thereof, it has a density of greater than about 1 g/mL.

In yet another aspect, the article includes a container that is composed of at least about 10 wt. %, preferably at least about 25 wt. %, more preferably at least about 50 wt %, even more preferably at least about 75 wt. %, for example, at least about 90 wt. % or about 100 wt. % of polypropylene (PP), based on the total weight of the container, which has a biobased content of at least about 90%, preferably at least about 93%, more preferably at least about 95%, for example, about 100%; and a polymer selected from the group consisting of post-consumer recycled polypropylene (PCR-PP), post-industrial recycled polypropylene (PIR-PP), regrind polypropylene, and a mixture thereof. The container has a density of less than about 1 g/mL.

The article of this aspect of the invention further includes a cap. In some embodiments, the cap is composed of a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); and a mixture thereof. In alternative embodiments, the cap is composed of linear low density polyethylene (LLDPE) that has a biobased content of at least about 90%, preferably at least about 93%, more preferably at least about 95%, for example, about 100%; post-consumer recycled LLDPE; post-industrial recycled LLDPE; high density polyethylene (HDPE) that has a biobased content of at least about 95%, preferably at least about 97%, more preferably at least about 99%, for example, about 100%; post-consumer recycled HDPE; post-industrial recycled polyethylene HDPE; low density polyethylene (LDPE) that has a biobased content of at least about 90%, preferably at least about 93%, more preferably at least about 95%, for example, about 100%; post-consumer recycled LDPE; post-industrial recycled LDPE; and a mixture thereof. The cap has a density of less than about 1 g/mL.

Still further, the article of this aspect of the invention includes a label. In some embodiments, the label is composed of ink and a substrate that includes a polymer selected from the group consisting of polyethylene that has a biobased content of at least about 90%, preferably at least about 93%, more preferably at least about 95%, for example, about 100%; post-consumer recycled polyethylene (PCR-PE), post-industrial recycled polyethylene (PIR-PE); paper; and a mixture thereof; and ink (e.g., soy-based, plant-based, or a mixture thereof). In alternative embodiments, the label is composed of a substrate that includes a polymer selected from the group consisting of polypropylene that has a biobased content of at least about 90%, preferably at least about 93%, more preferably at least about 95%, for example, about 100%; post-consumer recycled polypropylene (PCR-PP), post-industrial recycled polypropylene (PIR-PP); regrind polypropylene; paper; and a mixture thereof. In other alternative embodiments, the substrate includes a polymer selected from the group consisting of polyethylene terephthalate that has a biobased content of at least about 90%, preferably at least about 93%, more preferably at least about 95%, for example, about 100%; post-consumer recycled polyethylene terephthalate (PCR-PET); post-industrial recycled polyethylene terephthalate (PIR-PET); a polyester of furan dicarboxylic acid having a biobased content of at least about 90%, preferably at least about 93%, more preferably at least about 95%, for example, about 100%; a post-consumer recycled polyester of furan dicarboxylic acid; a post-industrial recycled polyester of furan dicarboxylic acid; a regrind polyester of furan dicarboxylic acid; paper; and a mixture thereof. When the label is composed of polyethylene or polypropylene, it has a density of less than about 1 g/mL. When the label is composed of polyethylene terephthalate, a polyester of furan dicarboxylic acid, or a mixture thereof, it has a density of greater than about 1 g/mL.

DETAILED DESCRIPTION OF THE INVENTION

A sustainable article that includes a container, a cap, and a label, has now been developed that is substantially free of virgin petroleum-based compounds. At least about 90 wt. %, preferably at least about 95 wt. %, more preferably at least about 97 wt %, of the article is derived from a combination of a renewable (i.e., derived from a renewable resource) material along with a recycled material, a regrind material, or a mixture thereof. The article has a shelf life of at least two years, is 100% sustainable, and is able to meet all current End of Life scenarios for similar articles derived from virgin petroleum-based sources.

As used herein, "sustainable" refers to a material having an improvement of greater than 10% in some aspect of its Life Cycle Assessment or Life Cycle Inventory, when compared to the relevant virgin petroleum-based plastic material that would otherwise have been used to manufacture the article. As used herein, "Life Cycle Assessment" (LCA) or "Life Cycle Inventory" (LCI) refers to the investigation and evaluation of the environmental impacts of a given product or service caused or necessitated by its existence. The LCA or LCI can involve a "cradle-to-grave" analysis, which refers to the full Life Cycle Assessment or Life Cycle Inventory from manufacture ("cradle") to use phase and disposal phase ("grave"). For example, high density polyethylene (HDPE) containers can be recycled into HDPE resin pellets, and then used to form containers, films, or injection molded articles, for example, saving a significant amount of fossil-fuel energy. At the end of its life, the polyethylene can be disposed of by incineration, for example. All inputs and outputs are considered for all the phases of the life cycle. As used herein, "End of Life" (EoL) scenario refers to the disposal phase of the LCA or LCI. For example, polyethylene can be recycled, incinerated for energy (e.g., 1 kilogram of polyethylene produces as much energy as 1 kilogram of diesel oil), chemically transformed to other products, and recovered mechanically. Alternatively, LCA or LCI can involve a "cradle-to-gate" analysis, which refers to an assessment of a partial product life cycle from manufacture ("cradle") to the factory gate (i.e., before it is transported to the customer) as a pellet. Alternatively, this second type of analysis is also termed "cradle-to-cradle".

As used herein, "recyclable" refers to the ability of the components of an article (e.g. bottle, cap, labels) to enter into current recycling streams established for petroleum-derived resins (e.g. HDPE, PET, PP) or paper without compromising the suitability of recycled resin or paper output for use in remaking components.

The article of the invention is advantageous because it has the same look and feel as similar articles made from virgin petroleum-based sources, similar performance characteristics as the articles made from virgin petroleum-based sources (e.g., similar drop and top load), and can be disposed of in the same way (e.g., by recycling the article), yet the article of the invention has improved sustainability over articles derived from virgin petroleum-based sources.

The article of the invention is also advantageous because any virgin polymer used in the manufacture of the article is derived from a renewable resource. As used herein, a "renewable resource" is one that is produced by a natural process at a rate comparable to its rate of consumption (e.g., within a 100 year time frame). The resource can be replenished naturally, or via agricultural techniques. Nonlimiting examples of renewable resources include plants (e.g., sugar cane, beets, corn, potatoes, citrus fruit, woody plants, lignocellulosics, hemicellulosics, cellulosic waste), animals, fish, bacteria, fungi, and forestry products. These resources can be naturally occurring, hybrids, or genetically engineered organisms. Natural resources such as crude oil, coal, natural gas, and peat, which take longer than 100 years to form, are not considered renewable resources. Because at least part of the article of the invention is derived from a renewable resource, which can sequester carbon dioxide, use of the article can reduce global way wing potential and fossil fuel consumption. For example, some LCA or LCI studies on the resin from which the article is derived have shown that about one ton of polyethylene made from virgin petroleum-based sources results in the emission of up to about 2.5 tons of carbon dioxide to the environment. Because sugar cane, for example, takes up carbon dioxide during growth, one ton of polyethylene made from sugar cane removes up to about 2.5 tons of carbon dioxide from the environment. Thus, use of about one ton of polyethylene from a renewable resource, such as sugar cane, results in a decrease of up to about 5 tons of environmental carbon dioxide versus using one ton of polyethylene derived from petroleum-based resources.

Nonlimiting examples of renewable polymers include polymers produced directly from organisms, such as polyhydroxyalkanoates (e.g., poly(beta-hydroxyalkanoate), poly(3-hydroxybutyrate-co-3-hydroxyvalerate, NODAX™), and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The sustainable article of the invention is further advantageous because its properties can be tuned by varying the amount of bio-material, recycled material, and regrind material used to form the container, cap, label, or mixture thereof, or by the introduction of fillers. For example, increasing the amount of bio-material at the expense of recycled material (when comparing like for like, e.g., homopolymer versus copolymer), tends to increase the stress crack resistance, increase the impact resistance, decrease opaqueness, and increase surface gloss. Increasing the amount of specific types of recycled and/or regrind material can improve some properties. For example, recycled material containing an elastomeric content will increase impact resistance, and reduce the cost of the article, depending on the exact grade. In contrast, recycled material that does not contain elastomeric content will often slightly decrease impact resistance. Further, because recycled material is often already colored, use of recycled materials over virgin materials often results in cost savings on colorant masterbatches, particularly if the color of the recycled material is similar to the intended color of the article.

The ability to tune the composition of the sustainable article of the invention allows the incorporation of polymers that are either less or more dense than water, to result in an overall composition that has a density below that of water, such as when the article is not composed of polyethylene terephthalate. Therefore, the sustainable article of the invention is easier to recycle in typical recycling streams than current plastic packaging materials that appear to be at least partly sustainable (e.g., those that include polylactic acid as part of the packaging), because issues concerning the contamination of polyethylene terephthalate streams during the floatation separation process can be avoided.

Even further, the article of the invention is advantageous because it can act as a one to one replacement for similar articles containing polymers that are wholly or partially derived from virgin petroleum-based materials, and can be produced using existing manufacturing equipment, reactor conditions, and qualification parameters. Its use results in a reduction of the environmental footprint, and in less consumption of non-renewable resources. The reduction of the environmental footprint occurs because the rate of replenishment of the resources used to produce article's raw construction material is equal to or greater than its rate of consumption; because the use of a renewable derived material often results in a reduction in greenhouse gases due to the sequestering of atmospheric carbon dioxide, or because the raw construction material is recycled (consumer or industrial) or reground within the plant, to reduce the amount of virgin plastic used and the amount of used plastic that is wasted, e.g., in a landfill. Further, the article of the invention does not lead to the destruction of critical ecosystems, or the loss of habitat for endangered species.

Sustainable, Recyclable, Article

The invention described herein relates to a sustainable article that has a shelf life of at least about two years, is 100% recyclable, and is substantially free of virgin petroleum-based materials (i.e., less than about 10 wt. %, preferably less than about 5 wt. %, more preferably less than about 3 wt. % of virgin petroleum-based materials, based on the total weight of the article). As used herein, "virgin petroleum-based" refers to materials that are derived from a petroleum source, such as oil, natural gas, or coal, and that have not been recycled, either industrially or through the consumer waste stream.

The sustainable article of the invention includes a container, a cap, and a label, with each of the components derived from renewable materials, recycled materials, regrind materials, or a mixture thereof. The container includes at least about 90 wt. %, preferably at least about 95 wt. %, more preferably at least about 97 wt %, for example, about 100 wt. % of bio-polymer, recycled polymer, regrind polymer, or a mixture thereof. The cap includes at least about 90 wt. %, preferably at least about 95 wt. %, more preferably at least about 97 wt. %, for example, about 100 wt. % of bio-polymer, recycled polymer, regrind polymer, or a mixture thereof. The label includes at least about 90 wt. %, preferably at least about 95 wt. %, more preferably at least about 97 wt. %, for example, about 100 wt. % of bio-polymer, recycled polymer, regrind polymer, or a mixture thereof.

Examples of renewable materials include bio-polyethylene, bio-polyethylene terephthalate, and bio-polypropylene. As used herein and unless otherwise noted, "polyethylene" encompasses high density polyethylene (HDPE), low density polyethylene (LDPE), linear low density polyethylene (LLDPE), and ultra low density polyethylene (ULDPE). As used herein and unless otherwise noted, "polypropylene" encompasses homopolymer polypropylene, random copolymer polypropylene, and block copolymer polypropylene.

As used herein, "recycled" materials encompass post-consumer recycled (PCR) materials, post-industrial recycled (PIR) materials, and a mixture thereof. In some embodiments, the container and/or cap of the invention are composed of recycled high density polyethylene, recycled polyethylene terephthalate, recycled polypropylene, recycled LLDPE, or recycled LDPE, preferably recycled high density polyethylene, recycled polyethylene terephthalate, or recycled polypropylene, more preferably recycled high density polyethylene or recycled polyethylene terephthalate. In some embodiments, the labels are composed of recycled high density polyethylene, polypropylene, or polyethylene terephthalate from containers.

As used herein, "regrind" material is thermoplastic waste material, such as sprues, runners, excess parison material, and reject parts from injection and blow molding and extrusion operations, which has been reclaimed by shredding or granulating.

As used herein, the prefix "bio-" is used to designate a material that has been derived from a renewable resource.

Bio-High Density Polyethylene

In one aspect, the sustainable article of the invention includes bio-high density polyethylene. Bio-polyethylene is produced from the polymerization of bio-ethylene, which is formed from the dehydration of bio-ethanol. Bio-ethanol can be derived from, for example, (i) the fermentation of sugar from sugar cane, sugar beet, or sorghum; (ii) the saccharification of starch from maize, wheat, or manioc; and (iii) the hydrolysis of cellulosic materials. U.S. Patent Application Publication No. 2005/0272134, incorporated herein by reference, describes the fermentation of sugars to form alcohols and acids.

Suitable sugars used to form ethanol include monosaccharides, disaccharides, trisaccharides, and oligosaccharides. Sugars, such as sucrose, glucose, fructose, and maltose, are readily produced from renewable resources, such as sugar cane and sugar beets. As previously described, sugars also can be derived (e.g., via enzymatic cleavage) from other agricultural products (i.e., renewable resources resulting from the cultivation of land or the husbandry of animals). For example, glucose can be prepared on a commercial scale by enzymatic hydrolysis of corn starch. Other common agricultural crops that can be used as the base starch for conversion into glucose include wheat, buckwheat, arracaha, potato, barley, kudzu, cassava, sorghum, sweet potato, yam, arrowroot, sago, and other like starchy fruit, seeds, or tubers. The sugars produced by these renewable resources (e.g., corn starch from corn) can be used to produce alcohols, such as propanol, ethanol, and methanol. For example, corn starch can be enzymatically hydrolyzed to yield glucose and/or other sugars. The resultant sugars can be converted into ethanol by fermentation.

Monofunctional alcohols, such as ethanol and propanol can also be produced from fatty acids, fats (e.g., animal fat), and oils (e.g., monoglycerides, diglycerides, triglycerides, and mixtures thereof). These fatty acids, fats, and oils can be derived from renewable resources, such as animals or plants. "Fatty acid" refers to a straight chain monocarboxylic acid having a chain length of 12 to 30 carbon atoms. "Monoglycerides," "diglycerides," and "triglycerides" refer to containing multiple mono-, di- and tri-esters, respectively, of (i) glycerol and (ii) the same or mixed fatty acids unsaturated double bonds. Nonlimiting examples of fatty acids include oleic acid, myristoleic acid, palmitoleic acid, sapienic acid, linoleic acid, linolenic acid, arachidonic acid, eicosapentaenoic acid, and docosahexaenoic acid. Nonlimiting examples of monoglycerides include monoglycerides of any of the fatty acids described herein. Nonlimiting examples of diglycerides include diglycerides of any of the fatty acids described herein. Nonlimiting examples of the triglycerides include triglycerides of any of the fatty acids described herein, such as, for example, tall oil, corn oil, soybean oil, sunflower oil, safflower oil, linseed oil, perilla oil, cotton seed oil, tung oil, peanut oil, oiticica oil, hempseed oil, marine oil (e.g. alkali-refined fish oil), dehydrated castor oil, and mixtures thereof. Alcohols can be produced from fatty acids through reduction of the fatty acids by any method known in the art. Alcohols can be produced from fats and oils by first hydrolyzing the fats and oils to produce glycerol and fatty acids, and then subsequently reducing the fatty acids.

In a preferred embodiment, the bio-ethylene is produced from sugar cane. The life cycle stages of ethylene production from sugar cane include (i) sugar cane farming, (ii) fermentation of sugar cane to form bio-ethanol, and (iii) dehydration of bio-ethanol to form ethylene. Specifically, sugar cane is washed and transported to mills where sugar cane juice is extracted, leaving filter cake, which is used as fertilizer, and bagasse (residual woody fiber of the cane obtained after crushing). The bagasse is burned to generate steam and the electricity used to power the sugar cane mills, thereby reducing the use of petroleum-derived fuels. The sugar cane juice is fermented using yeast to form a solution of ethanol and water. The ethanol is distilled from the water to yield about 95% pure bio-ethanol. The bio-ethanol is subjected to catalytic dehydration (e.g., with an alumina catalyst) to produce ethylene, which is subsequently polymerized to form polyethylene.

Advantageously, a Life Cycle Assessment & Inventory of ethylene produced from sugar cane shows favorable benefits in some aspects over ethylene produced from petroleum feedstock for global warming potential, abiotic depletion, and fossil fuel consumption. For example, some studies have shown that about one ton of polyethylene made from virgin petroleum-based sources results in the emission of up to about 2.5 tons of carbon dioxide to the environment, as previously described. Thus, use of up to about one ton of polyethylene from a renewable resource, such as sugar cane, results in a decrease of up to about 5 tons of environmental carbon dioxide versus using one ton of polyethylene derived from petroleum-based resources.

BRASKEM has demonstrated the production of high density polyethylene (HDPE) and linear, low density polyethylene (LLDPE) from sugar cane using a Hostalen/Basell technology for the HDPE production and a Spherilene/Basell technology for the LLDPE production. These catalysts allow (in some cases), superior processability of the bio-polyethylene and results in products with superior consistency to incumbent resins made by other processes.

A. Container

The container in this aspect of the invention is composed of at least about 10 wt. %, preferably at least about 25 wt. %, more preferably at least about 50 wt. %, even more preferably about 75 wt. %, for example, at least about 90 wt. % or 100 wt. % of high density polyethylene (HDPE), based on the total weight of the container, which has a biobased content of at least about 95%, preferably at least about 97%, more preferably at least about 99%, for example about 100%. As used herein, "biobased content" refers to the amount of bio-carbon in a material as a percent of the weight (mass) of the total organic carbon in the product (see the Assessment of the Biobased Content of Materials section).

The container further includes a polymer selected from the group consisting of post-consumer recycled polyethylene (PCR-PE), post-industrial recycled polyethylene (PIR-PE), regrind polyethylene, and a mixture thereof. The recycled polyethylene is optionally present in an amount of up to about 90 wt. %, preferably up to about 50 wt. %, more preferably up to about 25 wt. %, based on the total weight of the container. The regrind polyethylene is optionally present in an amount of up to about 75 wt. %, preferably up to about 50 wt. %, more preferably up to about 40 wt. %, based on the total weight of the container.

The container can include, for example, about 50 wt. % of bio-HDPE, about 25 wt. % of PCR-PE, and about 25 wt. % of regrind PE; or, if recycled PE is not available, about 65 wt. % of bio-HDPE and about 35 wt. % of regrind PE. The container has a density of less than about 1 g/mL to aid separation during the floatation process of recycling, as previously described.

B. Cap

In some embodiments, the cap in this aspect of the invention is composed of a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); and a mixture thereof. In some embodiments, the cap is composed of a polymer selected from the group consisting of linear low density polyethylene (LLDPE) that has a biobased content of at least about 90%, preferably at least about 93%, more preferably at least about 95%, for example, about 100%; post-consumer recycled LLDPE; post-industrial recycled LLDPE; high density polyethylene (HDPE) that has a biobased content of at least about 90%, preferably at least about 93%, more preferably at least about 95%, for example, about 100%; post-consumer recycled polyethylene (PCR-PE); post-industrial recycled polyethylene (PIR-PE); and a mixture thereof. For example, the cap can be composed of (i) a polymer selected from the group consisting of bio-linear low density polyethylene (LLDPE), as described above; post-consumer recycled LLDPE; post-industrial recycled LLDPE, and a mixture thereof; or (ii) a polymer selected from the group consisting of bio-high density polyethylene (HDPE), as described above; post-consumer recycled HDPE; post-industrial recycled polyethylene HDPE; low density polyethylene (LDPE) that has a biobased content of at least about 90%, preferably at least about 93%, more preferably at least about 95%, for example, about 100%; post-consumer recycled LDPE; post-industrial recycled LDPE; and a mixture thereof.

The cap has a density of less than about 1 g/mL to aid separation during the floatation process of recycling, as previously described. For example, the cap can include a mixture of bio-polypropylene and recycled polypropylene; recycled polypropylene without bio-polypropylene; or bio-polypropylene without recycled polypropylene.

C. Label

The label in this aspect of the invention is composed of a substrate that includes a polymer selected from the group consisting of polyethylene that has a biobased content of at least about 90%, preferably at least about 93%, more preferably at least about 95%, for example, about 100%; post-consumer recycled polyethylene (PCR-PE); post-industrial recycled polyethylene (PIR-PE); paper; and a mixture thereof. The polyethylene can include LDPE, LLDPE, or HDPE. In alternative embodiments, the substrate includes a polymer selected from the group consisting of polyethylene terephthalate that has a biobased content of at least about 90%, preferably at least about 93%, more preferably at least about 95%, for example, about 100%; post-consumer recycled polyethylene terephthalate (PCR-PET); post-industrial recycled polyethylene terephthalate (PM-PET); a polyester of furan dicarboxylic acid having a biobased content of at least about 90%, preferably at least about 93%, more preferably at least about 95%, for example, about 100%; a post-consumer recycled polyester of furan dicarboxylic acid; a post-industrial recycled polyester of furan dicarboxylic acid; a regrind polyester of furan dicarboxylic acid; paper; and a mixture thereof. In other alternative embodiments, the substrate includes a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); paper; and a mixture thereof.

The label further includes ink, which can be solvent-based or water-based. In some embodiments, the ink is derived from a renewable resource, such as soy, a plant, or a mixture thereof. The ink can be cured using heat or ultraviolet radiation (UV). In some preferred embodiments, the ink is cured by UV, which results in a reduction of curing time and energy output. Nonlimiting examples of inks include ECO-SURE!™ from Gans Ink & Supply Co. and the solvent-based VUTEk® and BioVu™ inks from EFI, which are derived completely from renewable resources (e.g., corn).

The label can be fixed to the container using adhesive. In some preferred embodiments, the adhesive is a renewable adhesive, such as BioTAK® by Berkshire Labels, which is fully biodegradable and compostable, conforms to European standard EN 13432, and is approved by the FDA, a shrink sleeve, or by melting the label onto the container during manufacturing. Alternatively, the label can be molded directly into the plastic of the container.

The label can optionally comprise layers. For example, a metallization effect results when a layer composed of ink/metallization is flanked by outer layers composed of polyethylene in a trilayer label.

When the label is composed of polyethylene or polypropylene, it has a density of less than about 1 g/mL to aid separation during the floatation process of recycling, as previously described. When the label is composed of polyethylene terephthalate, a polyester of furan dicarboxylic acid, or a mixture thereof, it has a density of greater than about 1 g/mL.

Bio-Polyethylene Terephthalate

In another aspect, the sustainable article of the invention includes bio-polyethylene terephthalate. Bio-polyethylene terephthalate is produced from the polymerization of bio-ethylene glycol with bio-terephthalic acid. Bio-ethylene glycol can be derived from renewable resources via a number of suitable routes, such as, for example, those described in WO 2009/155086 and U.S. Pat. No. 4,536,584, each incorporated herein by reference. Bio-terephthalic acid can be derived from renewable alcohols through renewable p-xylene, as described in International Patent Application Publication No. WO 2009/079213, which is incorporated herein by reference.

In some embodiments, a renewable alcohol (e.g., isobutanol) is dehydrated over an acidic catalyst in a reactor to form isobutylene. The isobutylene is recovered and reacted under the appropriate high heat and pressure conditions in a second reactor containing a catalyst known to aromatize aliphatic hydrocarbons to form renewable p-xylene.

In another embodiment, the renewable alcohol, e.g. isobutanol, is dehydrated and dimerized over an acid catalyst. The resulting diisobutylene is recovered and reacted in a second reactor to form renewable p-xylene.

In yet another embodiment, a renewable alcohol, e.g. isobutanol, containing up to 15 wt. % water is dehydrated, or dehydrated and oligomerized, and the resulting oligomers are aromatized to form renewable p-xylene.

In yet another embodiment, the dehydration of the renewable alcohol and the aromatization of the resulting alkene occurs in a single reactor using a single catalyst, to form a mixture of renewable aromatic compounds. The resulting renewable aromatic compounds are purified, e.g. by distillation or crystallization, to obtain pure streams of individual renewable aromatic products. The pure xylenes from these reactions are oxidized to their corresponding phthalic acids and phthalate esters.

Renewable phthalic acid or phthalate esters can be produced by oxidizing p-xylene over a transition metal catalyst (see, e.g., Ind. Eng. Chem. Res., 39:3958-3997 (2000)), optionally in the presence of one or more alcohols.

Unless otherwise noted, the polyethylene terephthalate used in this invention can be replaced with bio-, recycled, or regrind polyesters of furan dicarboxylic acid (FDCA), such as polyethylene 2,5-furandicarboxylate (PEF). FDCA can be produced from hydroxymethylfurfural (HMF), which is a dehydrated sugar molecule. FDCA can also be produced from methoxymethylfurfural (MMF), which is derived from glucose and fructose. The FDCA can be condensed with a bio-diol (e.g., bio-ethylene glycol) by any method known to one skilled in the art to form the desired polyester.

A. Container

The container in this aspect of the invention is composed of at least about 10 wt. %, preferably at least about 25 wt. %, more preferably at least about 50 wt. %, even more preferably at least about 75 wt. %, for example, at least about 90 wt. % or about 100 wt. % of polyethylene terephthalate (PET) or a polyester of furan dicarboxylic acid (e.g., polyethylene 2,5-furandicarboxylate (PEF)), based on the total weight of the container, which has a biobased content of at least about 90% preferably at least about 93%, more preferably at least about 95%, for example, about 100%.

In embodiments when the container includes PET with a biobased content of at least about 90%, the container further includes a polymer selected from the group consisting of post-consumer recycled polyethylene terephthalate (PCR-PET), post-industrial recycled polyethylene terephthalate (PIR-PET), regrind polyethylene terephthalate, and a mixture thereof. The recycled PET is optionally present in an amount of up to about 90 wt. %, preferably up to about 50 wt. %, more preferably up to about 25 wt. %, based on the total weight of the container. The regrind PET is optionally present in an amount of up to about 75 wt. %, preferably up to about 50 wt. %, more preferably up to about 40 wt. %, based on the total weight of the container. The container can include, for example, about 30 wt. % bio-PET and about 70 wt. % of PCR-PET.

In embodiments when the container includes a polyester of furan dicarboxylic acid with a biobased content of at least about 90%, the container further includes a polymer selected from the group consisting of a post-consumer recycled polyester of furan dicarboxylic acid, a post-industrial recycled polyester of furan dicarboxylic acid, a regrind polyester of furan dicarboxylic acid, and a mixture thereof. In these embodiments, the recycled polyester is optionally present in an amount of up to about 90 wt. %, preferably up to about 50 wt. %, more preferably up to about 25 wt. %, based on the total weight of the container. The regrind polyester is optionally present in an amount of up to about 75 wt. %, preferably up to about 50 wt. %, more preferably up to about 40 wt. %, based on the total weight of the container. The container can include, for example, about 30 wt. % bio-PEF and about 70 wt. % of PCR-PEF.

The container has a density of greater than about 1 g/mL.

B. Cap

In some embodiments, the cap in this aspect of the invention is composed of a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); and a mixture thereof. In some embodiments, the cap is composed of a polymer selected from the group consisting of linear low density polyethylene (LLDPE) that has a biobased content of at least about 90%, preferably at least about 93%, more preferably at least about 95%, for example, about 100%; post-consumer recycled LLDPE; post-industrial recycled LLDPE; high density polyethylene (HDPE) that has a biobased content of at least about 90%, preferably at least about 93%, more preferably at least about 95%, for example, about 100%; post-consumer recycled polyethylene (PCR-PE); post-industrial recycled polyethylene (PIR-PE); and a mixture thereof. For example, the cap can be composed of (i) a polymer selected from the group consisting of bio-linear low density polyethylene (LLDPE), as described above; post-consumer recycled LLDPE; post-industrial recycled LLDPE, and a mixture thereof; or (ii) a polymer selected from the group consisting of bio-high density polyethylene (HDPE), as described above; post-consumer recycled HDPE; post-industrial recycled HDPE; low density polyethylene (LDPE) that has a biobased content of at least about 90%, preferably at least about 93%, more preferably at least about 95%, for example, about 100%; post-consumer recycled LDPE; post-industrial recycled LDPE and a mixture thereof.

The cap has a density of less than about 1 g/mL to aid separation during the floatation process of recycling, as previously described. For example, the cap can include a mixture of bio-polypropylene and recycled polypropylene; recycled polypropylene without bio-polypropylene; or bio-polypropylene without recycled polypropylene.

C. Label

The label in this aspect of the invention is composed of a substrate that includes a polymer selected from the group consisting of polyethylene terephthalate that has a biobased content of at least about 90%, preferably at least about 93%, more preferably at least about 95%, for example, about 100%; post-consumer recycled polyethylene terephthalate (PET); post-industrial recycled PET; regrind PET; a polyester of furan dicarboxylic acid having a biobased content of at least about 90%, preferably at least about 93%, more preferably at least about 95%, for example, about 100%; a post-consumer recycled polyester of furan dicarboxylic acid; a post-industrial recycled polyester of furan dicarboxylic acid; a regrind polyester of furan dicarboxylic acid; paper, or a mixture thereof. In some alternative embodiments, the label is composed of a substrate that includes a polymer selected from the group consisting of polyethylene that has a biobased content of at least about 90%, preferably at least about 93%, more preferably at least about 95%, for example, about 100%; post-consumer recycled polyethylene (PCR-PE); post-industrial recycled polyethylene (PIR-PE); paper; and a mixture thereof. In other alternative embodiments, the substrate includes a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); paper; and a mixture thereof.

The label further includes ink, which can be solvent-based or water-based, as previously described. In some embodiments, the ink is derived from a renewable resource, such as soy, a plant, or a mixture thereof. The ink can be cured using heat or ultraviolet radiation (UV). In some preferred embodiments, the ink is cured by UV, which results in a reduction of curing time and energy output. Nonlimiting examples of inks include ECO-SURE!™ from Gans Ink & Supply Co. and the solvent-based VUTEk® and BioVu™ inks from EFI, which are derived completely from renewable resources (e.g., corn).

The label can be fixed to the container using adhesive. In some embodiments, the adhesive is a renewable adhesive, such as BioTAK® by Berkshire Labels, which is fully biodegradable and compostable, conforms to European standard EN 13432, and is approved by the FDA, a shrink sleeve, or by melting the label onto the container during manufacturing. Alternatively, the label can be molded directly into the plastic of the container.

The label can optionally comprise layers, as previously described.

When the label is composed of polyethylene or polypropylene, it has a density of less than about 1 g/mL. When the label is composed of polyethylene terephthalate, a polyester of furan dicarboxylic acid, or a mixture thereof, it has a density of greater than about 1 g/mL.

Bio-Polypropylene

In yet another aspect, the sustainable article of the invention includes bio-polypropylene. Bio-polypropylene is produced from the polymerization of propylene formed from the dehydration of propanol. Renewable resources used to derive propanol are as previously described. Propanol also can be derived from bio-ethylene. In this pathway, bio-ethylene is converted into propionaldehyde by hydroformylation using carbon monoxide and hydrogen in the presence of a catalyst, such as cobalt octacarbonyl or a rhodium complex. Hydrogenation of the propionaldehyde in the presence of a catalyst, such as sodium borohydride and lithium aluminum hydride, yields propan-1-ol, which can be dehydrated in an acid catalyzed reaction to yield propylene, as described in U.S. Patent Application Publication No. 2007/0219521, incorporated herein by reference.

A. Container

The container in this aspect of the invention is composed of at least about 10 wt. %, preferably at least about 25 wt. %, more preferably at least about 50 wt. %, even more preferably at least about 75 wt. %, for example, at least about 90 wt. % or about 100 wt. % of polypropylene (PP), based on the total weight of the container, which has a biobased content of at least about 90%, preferably at least about 93%, more preferably at least about 95%, for example, about 100%.

The container further includes a polymer selected from the group consisting of post-consumer recycled polypropylene (PCR-PP), post-industrial recycled polypropylene (PIR-PP), regrind polypropylene, and a mixture thereof. The recycled polypropylene is optionally present in an amount of up to about 90 wt. %, preferably up to about 50 wt. %, more preferably up to about 25 wt. %, based on the total weight of the container. The regrind polypropylene is optionally present in an amount of up to about 75 wt. %, preferably up to about 50 wt. %, more preferably up to about 40 wt. %, based on the total weight of the container.

The container has a density of less than about 1 g/mL to aid separation during the floatation process of typical recycling systems, as previously described. For example, the container can include about 50 wt. % of bio-PP, about 25 wt. % of PCR-PP, and about 25 wt. % of regrind PP; or, if recycled PP is not available, about 60 wt. % of bio-PP and about 40 wt. % of regrind PP.

B. Cap

In some embodiments, the cap in this aspect of the invention is composed of a polymer selected from the group consisting of polypropylene that has a biobased content of at least about 90%, preferably at least about 93%, more preferably at least about 95%, for example, about 100%; post-consumer recycled polypropylene (PCR-PP); post-industrial recycled polypropylene (PIR-PP); and a mixture thereof. In some embodiments, the cap is composed of a polymer selected from the group consisting of linear low density polyethylene (LLDPE) that has a biobased content of at least about 90%, preferably at least about 93%, more preferably at least about 95%, for example, about 100%; post-consumer recycled LLDPE; post-industrial recycled LLDPE; high density polyethylene (HDPE) that has a biobased content of at least about 95%, preferably at least about 97%, more preferably at least about 99%, for example, about 100%; post-consumer recycled polyethylene (PCR-PE); post-industrial recycled polyethylene (PIR-PE); and a mixture thereof. For example, the cap can be composed of (i) a polymer selected from the group consisting of bio-linear low density polyethylene (LLDPE), as described above; post-consumer recycled LLDPE; post-industrial recycled LLDPE, and a mixture thereof; or (ii) a polymer selected from the group consisting of bio-high density polyethylene (HDPE), as described above; post-consumer recycled HDPE; post-industrial recycled HDPE; low density polyethylene (LDPE) that has a biobased content of at least about 90%, preferably at least about 93%, more preferably at least about 95%, for example, about 100%; post-consumer recycled LDPE; post-industrial recycled LDPE; and a mixture thereof.

The cap has a density of less than about 1 g/mL to aid separation during the floatation process of recycling, as previously described. For example, the cap can include a mixture of bio-polypropylene and recycled polypropylene; recycled polypropylene without bio-polypropylene; or bio-polypropylene without recycled polypropylene.

C. Label

The label in this aspect of the invention is composed of a substrate that includes a polymer selected from the group consisting of polyethylene that has a biobased content of at least about 90%, preferably at least about 93%, more preferably at least about 95%, for example about 100%; post-consumer recycled polyethylene (PCR-PE); post-industrial recycled polyethylene (PIR-PE); paper; and a mixture thereof. In alternative embodiments, the label is composed of a substrate that includes a polymer selected from the group consisting of polypropylene that has a biobased content of at least about 90%, preferably at least about 93%, more preferably at least about 95%, for example, about 100%; post-consumer recycled polypropylene (PCR-PP), post-industrial recycled polypropylene (PIR-PP); regrind polypropylene; paper; and a mixture thereof. In other alternative embodiments, the substrate includes a polymer selected from the group consisting of polyethylene terephthalate that has a biobased content of at least about 90%, preferably at least about 93%, more preferably at least about 95%, for example, about 100%; post-consumer recycled polyethylene terephthalate (PCR-PET); post-industrial recycled polyethylene terephthalate (PIR-PET); a polyester of furan dicarboxylic acid having a biobased content of at least about 90%, preferably at least about 93%, more preferably at least about 95%, for example, about 100%; a post-consumer recycled polyester of furan dicarboxylic acid; a post-industrial recycled polyester of furan dicarboxylic acid; a regrind polyester of furan dicarboxylic acid; paper; and a mixture thereof.

The label further includes ink, which can be solvent-based or water-based, as previously described. In some embodiments, the ink is derived from a renewable resource, such as soy, a plant, or a mixture thereof. The ink can be cured using heat or ultraviolet radiation (UV). In some preferred embodiments, the ink is cured by UV, which results in a reduction of curing time and energy output. Nonlimiting examples of inks include ECO-SURE!™ from Gans Ink & Supply Co. and the solvent-based VUTEk® and BioVu™ inks from EFI, which are derived completely from renewable resources (e.g., corn).

The label can be fixed to the container using adhesive. In some embodiments, the adhesive is a renewable adhesive, such as BioTAK® by Berkshire Labels, which is fully biodegradable and compostable, conforms to European standard EN 13432, and is approved by the FDA, a shrink sleeve, or by melting the label onto the container during manufacturing. Alternatively, the label can be molded directly into the plastic of the container.

The label can optionally comprise layers, as previously described.

When the label is composed of polyethylene or polypropylene, it has a density of less than about 1 g/mL to aid separation during the floatation process of recycling, as previously described. When the label is composed of polyethylene terephthalate, a polyester of furan dicarboxylic acid, or a mixture thereof, it has a density of greater than about 1 g/mL.

Assessment of the Biobased Content of Materials

As used herein, "biobased content" refers to the amount of bio-carbon in a material as a percent of the weight (mass) of the total organic carbon in the product. For example, polyethylene contains two carbon atoms in its structural unit. If ethylene is derived from a renewable resource, then a homopolymer of polyethylene theoretically has a biobased content of 100% because all of the carbon atoms are derived from a renewable resource. A copolymer of polyethylene could also theoretically have a biobased content of 100% if both the ethylene and the co-monomer are each derived from a renewable resource. In embodiments where the co-monomer is not derived from a renewable resource, the HDPE will typically include only about 1 wt % to about 2 wt. % of the non-renewable co-monomer, resulting in HDPE having a theoretical biobased content that is slightly less than 100%. As another example, polyethylene terephthalate contains ten carbon atoms in its structural unit (i.e., two from the ethylene glycol monomer and eight from the terephthalic acid monomer). If the ethylene glycol portion is derived from a renewable resource, but the terephthalic acid is derived from a petroleum-based resource, the theoretical biobased content of the polyethylene terephthalate is 20%.

A suitable method to assess materials derived from renewable resources is through ASTM D6866, which allows the determination of the biobased content of materials using radiocarbon analysis by accelerator mass spectrometry, liquid scintillation counting, and isotope mass spectrometry. When nitrogen in the atmosphere is struck by an ultraviolet light produced neutron, it loses a proton and forms carbon that has a molecular weight of 14, which is radioactive. This $^{14}C$ is immediately oxidized into carbon dioxide, which represents a small, but measurable fraction of atmospheric carbon. Atmospheric carbon dioxide is cycled by green plants to make organic molecules during the process known as photosynthesis. The cycle is completed when the green plants or other forms of life metabolize the organic molecules producing carbon dioxide, which causes the release of carbon dioxide back to the atmosphere. Virtually all forms of life on Earth depend on this green plant production of organic molecules to produce the chemical energy that facilitates growth and reproduction. Therefore, the $^{14}C$ that exists in the atmosphere becomes part of all life forms and their biological products. These renewably based organic molecules that biodegrade to carbon dioxide do not contribute to global warming because no net increase of carbon is emitted to the atmosphere. In contrast, fossil fuel-based carbon does not have the signature radiocarbon ratio of atmospheric carbon dioxide. See WO 2009/155086, incorporated herein by reference.

The application of ASTM D6866 to derive a "biobased content" is built on the same concepts as radiocarbon dating, but without use of the age equations. The analysis is performed by deriving a ratio of the amount of radiocarbon ($^{14}C$) in an unknown sample to that of a modern reference standard. The ratio is reported as a percentage with the units "pMC" (percent modern carbon). If the material being analyzed is a mixture of present day radiocarbon and fossil carbon (containing no radiocarbon), then the pMC value obtained correlates directly to the amount of biomass material present in the sample.

The modern reference standard used in radiocarbon dating is a NIST (National Institute of Standards and Technology) standard with a known radiocarbon content equivalent approximately to the year AD 1950. The year AD 1950 was chosen because it represented a time prior to thermo-nuclear weapons testing, which introduced large amounts of excess radiocarbon into the atmosphere with each explosion (termed "bomb carbon"). The AD 1950 reference represents 100 pMC.

"Bomb carbon" in the atmosphere reached almost twice normal levels in 1963 at the peak of testing and prior to the treaty halting the testing. Its distribution within the atmosphere has been approximated since its appearance, showing values that are greater than 100 pMC for plants and animals living since AD 1950. The distribution of bomb carbon has gradually decreased over time, with today's value being near 107.5 pMC. As a result, a fresh biomass material, such as corn, could result in a radiocarbon signature near 107.5 pMC.

Petroleum-based carbon does not have the signature radiocarbon ratio of atmospheric carbon dioxide. Research has noted that fossil fuels and petrochemicals have less than about 1 pMC, and typically less than about 0.1 pMC, for example, less than about 0.03 pMC. However, compounds derived entirely from renewable resources have at least about 95 percent modern carbon (pMC), preferably at least about 99 pMC, for example, about 100 pMC.

Combining fossil carbon with present day carbon into a material will result in a dilution of the present day pMC content. By presuming that 107.5 pMC represents present day biomass materials and 0 pMC represents petroleum derivatives, the measured pMC value for that material will reflect the proportions of the two component types. A material derived 100% from present day soybeans would give a radiocarbon signature near 107.5 pMC. If that material was diluted with 50% petroleum derivatives, it would give a radiocarbon signature near 54 pMC.

A biobased content result is derived by assigning 100% equal to 107.5 pMC and 0% equal to 0 pMC. In this regard, a sample measuring 99 pMC will give an equivalent biobased content result of 93%.

Assessment of the materials described herein were done in accordance with ASTM D6866, particularly with Method B. The mean values quoted in this report encompasses an absolute range of 6% (plus and minus 3% on either side of the biobased content value) to account for variations in end-component radiocarbon signatures. It is presumed that all materials are present day or fossil in origin and that the desired result is the amount of bio-component "present" in the material, not the amount of bio-material "used" in the manufacturing process.

Other techniques for assessing the biobased content of materials are described in U.S. Pat. Nos. 3,885,155, 4,427,884, 4,973,841, 5,438,194, and 5,661,299, WO 2009/155086, each incorporated herein by reference.

EMBODIMENTS

The container of the sustainable article in any of the aspects, preferably when composed of polypropylene, can further include an impact modifier in an amount of about 2 wt. % to about 20 wt. %, preferably about 5 wt. % to about 10 wt. %. The impact modifier typically includes LDPE in an amount of about 5 wt. % to about 10 wt. %, an olefinic elastomer in an amount of about 5 wt. % to about 15 wt. %, a styrenic elastomer in an amount of about 2 wt. % to about 10 wt. %, or a mixture thereof. Examples of impact modifiers include Dow AFFINITY™ (i.e., polyolefin plastomer), Exxon Mobil VISTAMAXX™ (i.e., polypropylene based elastomer), and KRATON® from GLS (i.e., styrenic based block-copolymer/elastomer), any of which can vary in the level of saturation of the olefinic portion. The impact modifier can be derived wholly or partly from oil, wholly or partially from a renewable resource, or wholly or partially from recycled material.

The cap of the sustainable article in any of the aspects can optionally include up to 70 wt. %, preferably up to about 30 wt. %, more preferably up to about 40 wt. %, even more preferably up to about 50 wt. % of regrind polypropylene, regrind polyethylene, or a mixture thereof, based on the total weight of the cap. In some embodiments, the amount of regrind polymer can be about 5 wt. % to about 75 wt. %, preferably about 25 wt. % to about 50 wt. %, based on the total weight of the cap. The incorporation of regrind material in the cap decreases the cost of the resulting article and prevents material waste within plants, further improving sustainability of the plant.

Additionally or alternatively, the cap of the sustainable article in any of the aspects can optionally include elastomer derived from a recycled material, for example, from diaper scrap, which contains an amount of elastomer. The presence of elastomer in the cap improves, for example, the stress crack resistance, and drop impact resistance, of the cap. Elastomer can be present in the cap in an amount of about 0.1 wt. % to about 60 wt. %, preferably about 0.1 wt. % to about 40 wt. %, more preferably about 0.1 wt. % to about 20 wt. %, depending on the exact performance needs. The elastomer also can be derived wholly or partly from oil, wholly or partially from a renewable resource, or wholly or partially from recycled material.

At least one of the container, cap, or label of the sustainable article in aspects where the container, cap, and label are not composed of polyethylene terephthalate, can optionally include less than about 70 wt. % of a biodegradable polymer, based on the total weight of the container, cap, or label, as long as the resulting container, cap, or label has a density of less than 1 g/mL. The biodegradable polymer can be embedded into the polymer matrix of the renewable, recycled, or regrind material (e.g., by physical blending) to prevent the biodegradable polymer from being exposed to the surface of the article component, preventing it from biodegrading and/or deteriorating. Nonlimiting examples of biodegradable polymers include aliphatic polyesters, such as polylactic acid (PLA), polyglycolic acid (PGA), polybutylene succinate (PBS), and copolymers thereof; aliphatic-aromatic polyesters such as ECOFLEX® from BASF (i.e., an aliphatic-aromatic copolyester based on terephthalic acid, adipic acid, and 1,4-butanediol), BIOMAX® from DuPont (i.e., an aromatic copolyester with a high terephthalic acid content); polyhydroxyalkanoate (PHA), and copolymers thereof; thermoplastic starch (TPS) materials; cellulosics; and a mixture thereof. In some embodiments, the biodegradable polymer further includes an inorganic salt, such as calcium carbonate calcium sulfate, talcs, clays (e.g., nanoclays), aluminum hydroxide, $CaSiO_3$, glass fibers, crystalline silicas (e.g., quartz, novacite, crystallobite), magnesium hydroxide, mica, sodium sulfate, lithopone, magnesium carbonate, iron oxide, or a mixture thereof.

At least one of the container, cap, or label of the sustainable article in any of the aspects can optionally include a colorant masterbatch. As used herein, a "colorant masterbatch" refers to a mixture in which pigments are dispersed at high concentration in a carrier material. The colorant masterbatch is used to impart color to the final product. In some embodiments, the carrier is a biobased plastic or a petroleum-based plastic, while in alternative embodiments, the carrier is a biobased oil or a petroleum-based oil. The colorant masterbatch can be derived wholly or partly from a petroleum resource, wholly or partly from a renewable resource, or wholly or partly from a recycled resource. Nonlimiting examples of the carrier include bio-derived or oil derived polyethylene (e.g., LLDPE, LDPE, HDPE), bio-derived oil (e.g., olive oil, rapeseed oil, peanut oil), petroleum-derived oil, recycled oil, bio-derived or petroleum derived polyethylene terephthalate, polypropylene, and a mixture thereof. The pigment of the carrier, which can be derived from either a renewable resource or a non-renewable resource, can include, for example, an inorganic pigment, an organic pigment, a polymeric resin, or a mixture thereof. Nonlimiting examples of pigments include titanium dioxide (e.g., rutile, anatase), copper phthalocyanine, antimony oxide, zinc oxide, calcium carbonate, fumed silica, phthalocyamine (e.g., phthalocyamine blue), ultramarine blue, cobalt blue, monoazo pigments, diazo pigments, acid dye, base dye, quinacridone, and a mixture thereof. In some embodiments, the colorant masterbatch can further include one or more additives, which can either be derived from a renewable resource or a non-renewable resource. Nonlimiting examples of additives include slip agents, UV absorbers, nucleating agents, UV stabilizers, heat stabilizers, clarifying agents, fillers, brighteners, process aids, perfumes, flavors, and a mixture thereof.

In some embodiments, color can be imparted to the container, cap, or label of the sustainable article in any of the aspects by using direct compounding (i.e., in-line compounding). In these embodiments, a twin screw compounder is placed at the beginning of the injection molding, blow molding, or film line and additives, such as pigments, are blended into the resin just before article formation.

At least one of the container or cap of the sustainable article in any of the aspects can further include about 1 wt. % to about 50 wt. %, preferably about 3 wt. % to about 30 wt. %, more preferably about 5 wt. % to about 15 wt. % of a filler, based on the total weight of the container, cap, or label. Nonlimiting examples of fillers include starches, renewable fibers (e.g., hemp, flax, coconut, wood, paper, bamboo, grass), inorganic materials (e.g., calcium carbonate, mica, talc), gases (e.g., high pressure gas), foaming agents, microspheres, biodegradable polymers (e.g., PLA, PHA, TPS), a renewable, but non-biodegradable polymer (e.g., particles of cellulose acetate, polyaminde-11, alkyd resin), and mixtures thereof.

One or more of the container, cap, and label of the sustainable article in any of the aforementioned aspects can exhibit a single layer or multiple layers. When a component of the sustainable article exhibits multiple layers, the component can include 2, 3, 4, 5, 6, 7, 8, 9, or 10 layers. Preferably, the multilayer is a bilayer, trilayer, quadruple layer, or a quintuple layer. In some embodiments, the multilayer is a bilayer that has a weight ratio of outer layer to inner layer of about 99:1 to about 1:99, preferably about 10:90 to about 30:70, for example, about 20:80. In some embodiments, the multilayer is a trilayer that has a weight ratio of outer layer to middle layer to inner layer of about 1:98:1 to about 30:40:30, for example, about 5:90:5, 10:80:10 or 20:60:20. In some embodiments when a component of the article has at least three layers, recycled material, one or more biodegradable polymers (e.g., PLA, PHA, TPS, cellulose), or a mixture thereof comprises a middle layer. The middle layer composed of recycled material, biodegradable polymer, or a mixture thereof can further include an inorganic salt, such as calcium carbonate calcium sulfate, talcs, clays (e.g., nanoclays), aluminum hydroxide, $CaSiO_3$, glass fibers, crystalline silicas (e.g., quartz, novacite, crystallobite), magnesium hydroxide, mica, sodium sulfate, lithopone, magnesium carbonate, iron oxide, or a mixture thereof. A multilayer component with recycled material or biodegradable polymer as the middle layer can be achieved, for example, by injection techniques (e.g., co-injection), a stretch blow process, or an extrusion blow molding process, as described herein. In some embodiments, a multilayer component of the sustainable article includes a barrier layer to gases (e.g., oxygen, nitrogen, carbon dioxide, helium). The barrier layer can be biobased or petroleum-based, and composed of, for example, ethyl vinyl alcohol copolymer (EVOH).

Characterization of the Container, Cap, and Label

Each component of the article of the invention has a shelf life of at least about two years. The density of the container, cap, or label of the invention can be determined using ASTM D792.

A. Container

A container with a shelf life of at least two years can be characterized by at least one the following expedients: its water vapor transmission rate (WVTR), environmental stress cracking (ESC), and column crush.

Water vapor transmission rate is the steady state rate at which water vapor permeates through a film at specified conditions of temperature and relative humidity, and can be determined using ASTM 1249-06. A container of the invention that is composed of HDPE has a WVTR of less than about 0.3 grams per 100 square inches per 1 day (g/100 in$^2$/day), preferably less than about 0.2 g/100 in$^2$/day, more preferably less than about 0.1 g/100 in$^2$/day, at about 38° C. and about 90% relative humidity. A container of the invention that is composed of PP has a WVTR of less than about 0.6 g/100 in$^2$/day, preferably less than about 0.4 g/100 in$^2$/day, more preferably less than about 0.2 g/100 in$^2$/day, at about 38° C. and about 90% relative humidity. A container of the invention that is composed of PET has a WVTR of less than about 2.5 g/100 in$^2$/day, preferably less than about 1.25 g/100 in$^2$/day, more preferably less than about 0.625 g/100 in$^2$/day, at about 38° C. and about 90% relative humidity.

Environmental Stress Cracking (ESC) is the premature initiation of cracking and embrittlement of a plastic due to the simultaneous action of stress, strain, and contact with specific chemical environments. One method of determining ESC is by using ASTM D-2561. A container of the invention can survive a 4.5 kilogram load under 60° C. for 15 days, preferably for 30 days, when subjected to ASTM D-2561.

Alternatively, the ESC can be determined according to the following procedure. A container to be tested is filled with liquid to a target fill level and, optionally, a closure is fitted on the container. If the closure is a screw type closure, it is tightened to a specified torque. The test container is conditioned for four hours under 50° C.±1.5° C. The screw-type container caps are then re-torqued to the original specified torque level and leaking samples are eliminated. At its conditioning temperature, the container is placed in an upright position and a 4.5 to 5.0 kilogram weight is placed on top of it. The container is inspected every day for thirty days for evidence of stress cracking or signs of leakage that may indicate stress cracking. A container of the invention can survive a 4.5 to 5.0 kilogram load for about thirty days, during which the first fifteen days are the most critical.

The Column Crush test provides information about the mechanical crushing properties (e.g., crushing yield load, deflection at crushing yield load, crushing load at failure, apparent crushing stiffness) of blown thermoplastic containers. When an empty, uncapped, air vented container of the invention is subjected to the ASTM D-2659 Column Crush test using a velocity of 50 mm/min, the compression strength peak force (at a deflection of no more than about 5 mm), is no less than about 50 N, preferably no less than about 100 N, more preferably no less than about 230 N. Also, when the container of the invention is tested filled with water at a temperature between 28° C. and 42° C. and subjected to the ASTM D-2659 Column Crush test using a velocity of 12.5 mm/min, the compression strength peak force (at a deflection of no more than about 5 mm), is no less than about 150 N, preferably no less than about 250 N, more preferably no less than about 300 N. The Column Crush tests are performed in a room held at room temperature.

Additionally or alternatively, the raw construction material comprising HDPE, PET, or PP; and polymer, as described above, used to produce the container of the invention preferably has a heat distortion temperature or Vicat softening point as specified below, and/or can survive an applied stress according to the full notch creep test, as specified below.

Heat distortion temperature (HDT) is the temperature at which a test material deflects a specified amount when loaded in 3-point bending at a specified maximum outer fiber stress. The heat distortion temperature can be determined using the standard procedure outlined in ISO 75, where method A uses an outer fiber stress of 1.80 MPa, and method B uses an outer fiber stress of 0.45 MPa. The raw construction material of a HDPE container of the invention has a HDT of at least about 40° C., preferably at least about 45° C., more preferably at least about 50° C., according to method A and at least about 73° C., preferably at least about 80° C., more preferably at least about 90° C., according to method B. The raw construction material of a PET container of the invention has a HDT of at least about 61.1° C., preferably at least about 63° C., more preferably at least about 65° C. according to method A, and at least about 66.2° C., preferably at least about 68° C., more preferably at least about 70° C., according to method B. The raw construction material of a PP container of the invention has a HDT of at least about 57° C., preferably at least about 65° C., more preferably at least about 70° C., according to method A and at least about 75° C., preferably at least about 90° C., more preferably at least about 100° C., according to method B.

Vicat softening point is the determination of the softening point for materials that have no definite melting point, but can still be measured for those materials that do have melting point. It is taken as the temperature at which the material is penetrated to a depth of 1 millimeter by a flat-ended needle with a one square millimeter circular or square cross-section. The Vicat softening point can be determined using the standard procedure outlined in ISO 306, where a load of 10 N and a heating rate of 50° C. per hour is used for test method A50, and a load of 50 N and a heating rate of 50° C. per hour is used for test method B50. The raw construction material of a HDPE container of the invention has a Vicat softening temperature of at least about 112° C., preferably at least about 125° C., more preferably at least about 130° C., according to test method A50 and at least about 75° C., preferably at least about 77° C., more preferably at least about 80° C., according to test method B50. The raw construction material of a PET container of the invention has a Vicat softening temperature of at least about 79° C., preferably at least about 85° C., more preferably at least about 90° C., according to test method A50 and at least about 75° C., preferably at least about 77° C., more preferably at least about 80° C., according to test method B50. The raw construction material of a PP container of the invention has a Vicat softening temperature of at least about 125° C., preferably at least about 154° C., more preferably at least about 175° C., according to test method A50 and at least about 75° C., preferably at least about 85° C., more preferably at least about 95° C., according to test method B50.

The Full Notch Creep Test (FNCT) is an accelerated test used to assess the resistance of a polymer to slow crack growth in a chosen environment. When subjected to the FNCT described in ISO 16770, the raw construction material of a HDPE or a PP container of the invention can survive at least about 4 hours, preferably at least about 18 hours, more preferably at least about 50 hours, even more preferably about 100 hours at an applied stress of about 4.4 MPa, at room temperature.

B. Cap

A cap with a shelf life of at least two years can be characterized by at least one of the following expedients: its hinge life, if the cap design include a hinge, stress crack resistance, drop impact resistance, change in modulus with immersion in water, and Vicat softening point. Hinge life is the ability of a hinge to sustain multiple openings by a person or a machine. If the hinge life of the cap is tested manually, the cap of the invention can sustain at least about 150, preferably at least about 200, more preferably at least about 300 openings by the person at room temperature. If the hinge life of the cap is tested by machine, it can sustain at least about 1500, preferably at least about 1700, more preferably at least about 2000 openings by the machine at room temperature. In some of these embodiments, the cap is comprised of polypropylene. After each test, the hinge region is inspected for breakages. When the cap of the invention is placed in a cold environment (e.g., less than about 5), it shows no breakages.

Stress crack resistance of the cap can be determined by the ESC methods previously described. For example, a cap of the invention can survive a 4.5 kilogram load at about 50° C. for about fifteen days, preferably for about thirty days. Alternatively, under ASTM D-5419, a cap of the invention can withstand cracking at immersion stress crack resistance (ISCR) and exhibit no de-coloration for about 15 days, preferably for about 30 days.

Drop impact resistance is the ability of a cap to survive a fall. To determine drop impact resistance, a container that is free from damage and constructed as intended is filled with tap water to nominal fill capacity and left uncapped for 24 hours at 23±2° C. to achieve normalized temperature. The container is capped and dropped from a specified height. A cap of the invention, when assembled on a container that is filled with water, can survive a side panel or horizontal drop and an upside-down drop from a height of about 1.2 m. A cap of the invention, when assembled on a container that is filled with water, can survive a vertical bottom drop from a height of about 1.5 m.

Additionally or alternatively, the raw construction material comprising the PP, LLDPE, HDPE, and LDPE cap, as described above, used to produce the cap of the invention preferably has a change in modulus with immersion in water or Vicat softening point as specified below.

Change in modulus with immersion in water is tested with ASTM D-638, which measures the modulus of plastics. The modulus is compared before and after immersion in product for two weeks at room temperature and at 45° C. The raw construction material comprising the cap of the invention exhibits negligible change in modulus when it is immersed in water, with less than about 1% reduction in modulus.

The raw construction material comprising the cap of the invention exhibits a Vicat softening point of at least about 75° C., preferably at least about 125° C., according to test method A50 of ISO 306, as previously described. For example, the raw construction material comprising the cap of the invention can exhibit a Vicat softening point of about 75° C. to about 175° C., preferably about 125° C. to about 154° C. The cap of the invention exhibits a Vicat softening point of at least about 50° C. to about 95° C., preferably about 75° C. to about 85° C., according to test method B50 of ISO 306, as previously described.

C. Label

A label with a shelf life of at least two years can be characterized by at least one of the following expedients: its chemical resistance, product resistance, shrinkage, friction test, and rub test. The chemical resistance of the label is determined by the Soak Squeeze Test, which assesses the label adhesion to the container, the label de-lamination resistance, and the label product or water resistance during a simulated shower or bath use. The results of the test are determined by the performance of the label after submerging containers filled with a diluted soap solution in a 38° C. diluted soap solution bath (i.e., 5 grams per liter) for one hour and squeezing the container 10, 50, and 100 times. The labels of the invention exhibit no change (e.g., creases in the label, blisters, bubbles, flaking ink, changes in printing ink colors) after the multiple squeezes.

Product resistance is the ability of a label to resist its intended product. To test product compatibility, product is dropped on the printed side of label at about 20 to 24° C. After about 24 hours, the product is wiped off the label surface using a soft paper tissue, and the label is examined for traces of ink bleed, surface discoloration, and foil blocking. The labels of the invention exhibit no change in each of the examined parameters.

Shrinkage is the loss of label size. The labels of the invention exhibit less than about 0.2%, preferably less than about 0.1%, shrinkage 24 hours after their manufacture.

The friction test measures the level of friction of label surfaces to determine the slip of the product on a packing line's conveyors. In this test, a label is wrapped around a 200 g steel block and dragged at least 15 mm across a rubber mat at a rate of 150 mm/min. The labels of the invention remain unchanged when subjected to the friction test.

The rub test ensures that label artwork does not rub off or scratch during manufacture or use. In this test, a label is folded with printed side in and placed between the thumb and forefinger. The label is lightly rolled back and forth between the finger for ten cycles. The label of the invention remains unchanged after the rub test.

Methods

A. Containers

The containers of the invention can be produced using blow molding. Blow molding is a manufacturing process by which hollow plastic parts are formed from thermoplastic materials. The blow molding process begins with melting down thermoplastic and forming it into a parison or preform. The parison is a tube-like piece of plastic with a hole in one end through which compressed air can pass. Pressurized gas, usually air, is used to expand the parison or the hot preform and press it against a mold cavity. The pressure is held until the plastic cools. After the plastic has cooled and hardened the mold opens up and the part is ejected.

There are three main types of blow molding: extrusion blow molding, injection blow molding, and injection stretch blow molding. In extrusion blow molding, a molten tube of plastic is extruded into a mold cavity and inflated with compressed air. One end of the cylinder is pinched closed. After the plastic part has cooled, it is removed from the mold. Extrusion blow molding can be used to produce the HDPE and PP containers of the invention. These containers can be single layer or multilayer.

Injection blow molding (IBM) involves three steps: injection, blowing and ejection. First, molten polymer is fed into a manifold where it is injected through nozzles into a hollow, heated preform mold. The preform mold forms the external shape of the resulting container and is clamped around a mandrel (the core rod) which forms the internal shape of the preform. The preform consists of a fully formed bottle/jar neck with a thick tube of polymer attached, which will form the body. The preform mold opens and the core rod is rotated and clamped into the hollow, chilled blow mold. The core rod opens and allows compressed air into the preform, which inflates it to the finished article shape. After a cooling period the blow mold opens and the core rod is rotated to the ejection position. The finished article is stripped off the core rod and leak-tested. Injection blow molding, as well as the other blow molding methods described herein, is useful for the formation of article components that have embedded biodegradable polymer. Injection blow molding can be used to produce containers that include blends of biodegradable polymers.

Injection stretch blow molding (ISBM) is a method for producing a plastic container from a preform or parison that is stretched in both the hoop direction and the axial direction when the preform is blown into its desired container shape. In the ISBM process, a plastic is first molded into a "preform" using the injection molding process. These preforms are produced with the necks of the containers, including threads. The preforms are packaged, and after cooling, fed into a reheat stretch blow molding machine. The preforms are heated above their glass transition temperature, then blown using high pressure air into containers using metal blow molds. Typically, the preform is stretched with a core rod as part of the process. Injection stretch blow molding can be used to produce the HDPE, PET, and PP containers of the invention.

B. Caps

The caps of the invention can be formed using injection molding. Injection molding is a manufacturing process for producing parts from thermoplastic materials, thermosetting plastic materials, or a mixture thereof. During injection molding, polymeric material is fed into a barrel, mixed, formed into a melt, and forced into a three-dimensional mold cavity where it solidifies into the configuration of the mold cavity via cooling, heating, and/or chemical reaction. Injection molding can be used to make single layer caps or multilayer caps.

C. Labels

The labels of the invention can be formed using film extrusion. In film extrusion, thermoplastic material is melted and formed into a continuous profile. In some embodiments, multilayer films are coextruded. Film extrusion and coextrusion can be performed by any method known to one skilled in the art.

EXAMPLES

The compositions illustrated in the following Examples illustrate specific embodiments of the components of the article of the present invention, but are not intended to be limiting thereof. Other modifications can be undertaken by the skilled artisan without departing from the spirit and scope of this invention.

The components illustrated in the following Examples are prepared by conventional formulation and mixing methods, examples of which are described above All exemplified amounts are listed as weight percents and exclude minor materials such as diluents, preservatives, color solutions, imagery ingredients, botanicals, and so forth, unless otherwise specified.

Example 1

The following examples are representative of suitable compositions to form the bio-high density polyethylene containers of the invention.

|   | Layers | Bio-HDPE[1] (wt. %) | Recycled PE[2] (wt. %) | Regrind PE (wt. %) | Colorant Masterbatch (wt. %) | Filler(s) (wt. %) |
|---|---|---|---|---|---|---|
| A | Single Layer | 48 | 25 | 25 | Schulman POLYBATCH ® B8750[3] (2) | 0 |
| B | Single Layer | 58 | 0 | 40 | Schulman POLYBATCH ® B8750[3] (2) | 0 |
| C | Single Layer | 68 | 0 | 25 | Schulman POLYBATCH ® B8750[3] (2) | CaCO$_3$ (5) |
| D | Single Layer | 65.5 | 0 | 25 | Schulman POLYBATCH ® B8750[3] (4) | CaCO$_3$ (5.5) |
| E | Outer Layer (20 wt. %) | 98 | 0 | 0 | POLYONE CC100425O2[4] (2) | 0 |
|   | Inner Layer (80 wt. %) | 60 | 31 | 0 | Heritage POLYMAX CB1[5] (9) | 0 |
| F | Outer Layer (20 wt. %) | 92 | 0 | 0 | POLYONE PG101028.00[6] (8) | 0 |
|   | Inner Layer (80 wt. %) | 61 | 31 | 0 | 0 | Heritage POLYMAX CB2[7] (8) |
| G | Outer Layer (20 wt. %) | 92 | 0 | 0 | POLYONE PG101028.00[6] (8) | 0 |

-continued

| Layers | Bio-HDPE[1] (wt. %) | Recycled PE[2] (wt. %) | Regrind PE (wt. %) | Colorant Masterbatch (wt. %) | Filler(s) (wt. %) |
|---|---|---|---|---|---|
| Inner Layer (80 wt. %) | 60 | 31 | 0 | 0 | Heritage POLYMAX CB2[7] (9) |

[1] SGF4950 by BRASKEM
[2] 101-150 by KW/PCA
[3] a white masterbatch with 50 wt. % TiO₂, proprietary coating for the TiO₂, and LLDPE carrier resin
[4] a pearl, white masterbatch containing TiO₂, mica, and LLDPE carrier
[5] a white masterbatch containing calcium carbonate (73.6 wt. %), titanium dioxide (6.4 wt. %), and LLDPE carrier resin (20.0 wt. %)
[6] a pearl, white masterbatch containing TiO₂, mica, and LLDPE carrier
[7] a white masterbatch containing calcium carbonate (62 wt. %), titanium dioxide (17 wt. %), and LLDPE carrier resin (21 wt. %)

The colorant masterbatches and fillers in the above table can be substituted with any colorant masterbatch and filler previously described herein, or known to one skilled in the art.

Example 2

The following examples are representative of suitable compositions to form the bio-polyethylene terephthalate containers of the invention using a liquid colorant masterbatch.

| | Layers | Bio-PET (wt. %) | Recycled PET[1] (wt. %) | Liquid Colorant Masterbatch (wt. %) | Filler(s) (wt. %) | EVOH Barrier Layer |
|---|---|---|---|---|---|---|
| A | Single Layer | 30 | 70 | 0 | 0 | 0 |
| B | Single Layer | 30 | 69.925 | Colormatrix Light magenta 183-10041-3 (0.075) | 0 | 0 |
| C | Single Layer | 30 | 69.82 | Colormatrix New Orange 187-10022-1 (0.18) | 0 | 0 |
| D | Single Layer | 30 | 59.82 | Colormatrix New Orange 187-10022-1 (0.18) | silica (10) | 0 |
| E | Single Layer | 30 | 49.82 | Colormatrix New Orange 187-10022-1 (0.18) | silica (20) | 0 |
| F | Single Layer | 0 | 100 | 0 | 0 | 0 |
| G | Single Layer | 0 | 99.925 | Colormatrix Light magenta 183-10041-3 (0.075) | 0 | 0 |
| H | Single Layer | 0 | 99.82 | Colormatrix New Orange 187-10022-1 (0.18) | 0 | 0 |
| I | Single Layer | 100 | 0 | 0 | 0 | 0 |
| J | Single Layer | 99.925 | 0 | Colormatrix Light magenta 183-10041-3 (0.075) | 0 | 0 |
| K | Single Layer | 98.82 | 0 | Colormatrix New Orange 187-10022-1 (0.18) | 0 | 0 |
| L | Outer Layer | 10 | 0 | 0 | 0 | 0 |
| | Middle Layer | 0 | 79.925 | Colormatrix Light magenta 183-10041-3 (0.075) | 0 | 0 |
| | Inner Layer | 10 | 0 | 0 | 0 | 0 |
| M | Outer Layer | 49 | 0 | 0 | 0 | 0 |
| | Middle Barrier Layer | 0 | 0 | 0 | 0 | 2 |
| | Inner Layer | 49 | 0 | 0 | 0 | 0 |
| N | Outer Layer | 23.925 | 0 | Colormatrix Light magenta 183-10041-3 (0.075) | 0 | 0 |
| | Barrier Layer | 0 | 0 | 0 | 0 | 1 |
| | Middle Layer | 0 | 50 | 0 | 0 | 0 |
| | Barrier Layer | 0 | 0 | 0 | 0 | 1 |
| | Inner Layer | 23.925 | 0 | Colormatrix Light magenta 183-10041-3 (0.075) | 0 | 0 |

[1] LNO c rPET by PHOENIX TECHNOLOGIES, rPET by EVERGREEN, CT-1500 by CLEAN TECH, or NPL by PHOENIX TECHNOLOGIES

The following examples are representative of suitable compositions to form the bio-polyethylene terephthalate containers of the invention using a liquid colorant masterbatch that is opaque.

| | Layers | Bio-PET (wt. %) | Recycled PET[1] (wt. %) | Liquid Colorant Masterbatch Opaque (wt. %) | Filler(s) (wt. %) | EVOH Barrier Layer |
|---|---|---|---|---|---|---|
| A | Single Layer | 30 | 70 | 0 | 0 | 0 |
| B | Single Layer | 30 | 68.5 | Colormatrix Coral Iridescent (1.5) | 0 | 0 |
| C | Single Layer | 30 | 67.25 | Colormatrix Blue Pearl (2.75) | 0 | 0 |
| D | Single Layer | 30 | 60 | 0 | silica (10) | 0 |
| E | Single Layer | 30 | 50 | 0 | silica (20) | 0 |
| F | Single Layer | 0 | 100 | 0 | 0 | 0 |
| G | Single Layer | 0 | 98.5 | Colormatrix Coral Iridescent (1.5) | 0 | 0 |
| H | Single Layer | 0 | 97.25 | Colormatrix Blue Pearl (2.75) | 0 | 0 |
| I | Single Layer | 100 | 0 | 0 | 0 | 0 |
| J | Single Layer | 98.5 | 0 | Colormatrix Coral Iridescent (1.5) | 0 | 0 |
| K | Single Layer | 97.25 | 0 | Colormatrix Blue Pearl (2.75) | 0 | 0 |
| L | Outer Layer | 10 | 0 | 0 | 0 | 0 |
| | Middle Layer | 0 | 78.5 | Colormatrix Coral Iridescent (1.5) | 0 | 0 |
| | Inner Layer | 10 | 0 | 0 | 0 | 0 |
| M | Outer Layer | 49 | 0 | 0 | 0 | 0 |
| | Middle Barrier Layer | 0 | 0 | 0 | 0 | 2 |
| | Inner Layer | 49 | 0 | 0 | 0 | 0 |
| N | Outer Layer | 22.5 | 0 | Colormatrix Coral Iridescent (1.5) | 0 | 0 |
| | Barrier Layer | 0 | 0 | 0 | 0 | 1 |
| | Middle Layer | 0 | 50 | 0 | 0 | 0 |
| | Barrier Layer | 0 | 0 | 0 | 0 | 1 |
| | Inner Layer | 22.5 | 0 | Colormatrix Coral Iridescent (1.5) | 0 | 0 |

[1]LNO c rPET by PHOENIX TECHNOLOGIES, rPET by EVERGREEN, CT-1500 by CLEAN TECH, or NPL by PHOENIX TECHNOLOGIES

The following examples are representative of suitable compositions to form the bio-polyethylene terephthalate containers of the invention using a solid colorant masterbatch that is translucent.

| | Layers | Bio-PET (wt. %) | Recycled PET[1] (wt. %) | Solid Colorant Masterbatch Translucent (wt. %) | Filler(s) (wt. %) | EVOH Barrier Layer |
|---|---|---|---|---|---|---|
| A | Single Layer | 30 | 70 | 0 | 0 | 0 |
| B | Single Layer | 30 | 68.6 | Clariant UV red, Renol NB310501009 (1.4) | 0 | 0 |
| C | Single Layer | 30 | 68 | Clariant UV red, Renol NB310501009 (2) | 0 | 0 |
| D | Single Layer | 30 | 58.6 | Clariant UV red, Renol NB310501009 (1.4) | silica (10) | 0 |
| E | Single Layer | 30 | 48.6 | Clariant UV red, Renol NB310501009 (1.4) | silica (20) | 0 |
| F | Single Layer | 0 | 100 | 0 | 0 | 0 |
| G | Single Layer | 0 | 98.6 | Clariant UV red, Renol NB310501009 (1.4) | 0 | 0 |

-continued

| | Layers | Bio-PET (wt. %) | Recycled PET[1] (wt. %) | Solid Colorant Masterbatch Translucent (wt. %) | Filler(s) (wt. %) | EVOH Barrier Layer |
|---|---|---|---|---|---|---|
| H | Single Layer | 0 | 98 | Clariant UV red, Renol NB310501009 (2) | 0 | 0 |
| I | Single Layer | 100 | 0 | 0 | 0 | 0 |
| J | Single Layer | 98.6 | 0 | Clariant UV red, Renol NB310501009 (1.4) | 0 | 0 |
| K | Single Layer | 98 | 0 | Clariant UV red, Renol NB310501009 (2) | 0 | 0 |
| L | Outer Layer | 10 | 0 | 0 | 0 | 0 |
| | Middle Layer | 0 | 78.6 | Clariant UV red, Renol NB310501009 (1.4) | 0 | 0 |
| | Inner Layer | 10 | 0 | 0 | 0 | 0 |
| M | Outer Layer | 49 | 0 | 0 | 0 | 0 |
| | Middle Barrier Layer | 0 | 0 | 0 | 0 | 2 |
| | Inner Layer | 49 | 0 | 0 | 0 | 0 |
| N | Outer Layer | 22.6 | 0 | Clariant UV red, Renol NB310501009 (1.4) | 0 | 0 |
| | Barrier Layer | 0 | 0 | 0 | 0 | 1 |
| | Middle Layer | 0 | 50 | 0 | 0 | 0 |
| | Barrier Layer | 0 | 0 | 0 | 0 | 1 |
| | Inner Layer | 22.6 | 0 | Clariant UV red, Renol NB310501009 (1.4) | 0 | 0 |

[1] LNO c rPET by PHOENIX TECHNOLOGIES, rPET by EVERGREEN, CT-1500 by CLEAN TECH, or NPL by PHOENIX TECHNOLOGIES

The following examples are representative of suitable compositions to form the bio-polyethylene terephthalate containers of the invention, using a solid colorant masterbatch that is opaque.

| | Layers | Bio-PET (wt. %) | Recycled PET[1] (wt. %) | Solid Colorant Masterbatch Opaque (wt. %) | Filler(s) (wt. %) | EVOH Barrier Layer |
|---|---|---|---|---|---|---|
| A | Single Layer | 30 | 70 | 0 | 0 | 0 |
| B | Single Layer | 30 | 67.5 | Clariant Periwinkle blue, Renol NB52050144ZN (2.5) | 0 | 0 |
| C | Single Layer | 30 | 65 | Clariant White, Tersar/N PD Blanc 36352 (5) | 0 | 0 |
| D | Single Layer | 30 | 57.5 | Clariant Periwinkle blue, Renol NB52050144ZN (2.5) | 10 wt. % silica | 0 |
| E | Single Layer | 30 | 47.5 | Clariant Periwinkle blue, Renol NB52050144ZN (2.5) | 20 wt. % silica | 0 |
| F | Single Layer | 0 | 100 | 0 | 0 | 0 |
| G | Single Layer | 0 | 97.5 | Clariant Periwinkle blue, Renol NB52050144ZN (2.5) | 0 | 0 |
| H | Single Layer | 0 | 95 | Clariant White, Tersar/N PD Blanc 36352 (5) | 0 | 0 |
| I | Single Layer | 100 | 0 | 0 | 0 | 0 |
| J | Single Layer | 97.5 | 0 | Clariant Periwinkle blue, Renol NB52050144ZN (2.5) | 0 | 0 |
| K | Single Layer | 95 | 0 | Clariant White, Tersar/N PD Blanc 36352 (5) | 0 | 0 |

-continued

| | Layers | Bio-PET (wt. %) | Recycled PET[1] (wt. %) | Solid Colorant Masterbatch Opaque (wt. %) | Filler(s) (wt. %) | EVOH Barrier Layer |
|---|---|---|---|---|---|---|
| L | Outer Layer | 10 | 0 | 0 | 0 | 0 |
| | Middle Layer | 0 | 77.5 | Clariant Periwinkle blue, Renol NB52050144ZN (2.5) | 0 | 0 |
| | Inner Layer | 10 | 0 | 0 | 0 | 0 |
| M | Outer Layer | 49 | 0 | 0 | 0 | 0 |
| | Middle Barrier Layer | 0 | 0 | 0 | 0 | 2 |
| | Inner Layer | 49 | 0 | 0 | 0 | 0 |
| N | Outer Layer | 21.5 | 0 | Clariant Periwinkle blue, Renol NB52050144ZN (2.5) | 0 | 0 |
| | Barrier Layer | 0 | 0 | 0 | 0 | 1 |
| | Middle Layer | 0 | 50 | 0 | 0 | 0 |
| | Barrier Layer | 0 | 0 | 0 | 0 | 1 |
| | Inner Layer | 21.5 | 0 | Clariant Periwinkle blue, Renol NB52050144ZN (2.5) | 0 | 0 |

[1]LNO crPET by PHOENIX TECHNOLOGIES, rPET by EVERGREEN, CT-1500 by CLEAN TECH, or NPL by PHOENIX TECHNOLOGIES

The colorant masterbatches and fillers in each of the above tables can be substituted with any colorant masterbatch and filler previously described herein, or known to one skilled in the art.

Example 3

The following examples are representative of suitable compositions to form the bio-polypropylene containers of the invention.

| | Layers | Bio-PP[1] (wt. %) | Recycled PP[2] (wt. %) | Regrind PP[3] (wt. %) | Colorant Masterbatch[4] (wt. %) | Filler(s)[5] (wt. %) | Impact Modifier[6] (wt. %) |
|---|---|---|---|---|---|---|---|
| A | Single Layer | 46 | 25 | 25 | 2 | 0 | 2 |
| B | Single Layer | 56 | 0 | 40 | 2 | 0 | 2 |
| C | Single Layer | 64 | 0 | 25 | 2 | 5 | 4 |
| D | Single Layer | 61.5 | 0 | 25 | 4 | 5.5 | 4 |
| E | Outer Layer (20 wt. %) | 96 | 0 | 0 | 2 | 0 | 2 |
| | Inner Layer (80 wt. %) | 58 | 31 | 0 | 9 | 0 | 2 |
| F | Outer Layer (20 wt. %) | 90 | 0 | 0 | 8 | 0 | 2 |
| | Inner Layer (80 wt. %) | 57 | 31 | 0 | 0 | 8 | 4 |
| G | Outer Layer (20 wt. %) | 88 | 0 | 0 | 8 | 0 | 4 |
| | Inner Layer (80 wt. %) | 56 | 31 | 0 | 0 | 9 | 4 |

[1]development grade by BRASKEM
[2]WM054 by WELLMARK
[3]can be any regrind PP described herein or known to one skilled in the art
[4]OM51687650 by CLARIANT
[5]OMYACARB ® F-FL by OMYA
[6]MD6932 by KRATON In some embodiments where the polypropylene container is multilayered, the outer layer is composed of polypropylene and an inner layer is composed of polyethylene. The colorant masterbatches, fillers, and impact modifiers in the above table can be substituted with any colorant masterbatch and filler previously described herein, or known to one skilled in the art.

Example 4

The following examples are representative of suitable compositions to form the caps of the invention. The caps of the invention can be characterized by the methods and specifications previously described.

| | Layers | Bio-PP[1] (wt. %) | Recycled PP[2] (wt. %) | Bio-LDPE[3] (wt. %) | Recycled LDPE[4] (wt. %) | Recycled-HDPE[5] (wt. %) | Colorant[6] (wt. %) |
|---|---|---|---|---|---|---|---|
| A | Single Layer | 99.5 | 0 | 0 | 0 | 0 | 0.50 |
| B | Single Layer | 0 | 99.5 | 0 | 0 | 0 | 0.50 |
| C | Single Layer | 49.5 | 50 | 0 | 0 | 0 | 0.50 |
| D | Single Layer | 49.5 | 40 | 0 | 0 | 10 | 0.50 |
| E | Outer Layer (20 wt. %) | 49.5 | 0 | 0 | 0 | 0 | 0.50 |
|   | Inner Layer (80 wt. %) | 0 | 50 | 0 | 0 | 0 | 0 |
| F | Outer Layer (20 wt. %) | 50 | 0 | 0 | 0 | 0 | 0 |
|   | Inner Layer (80 wt. %) | 0 | 0 | 0 | 0 | 50 | 0 |
| G | Outer Layer | 25 | 25 | 0 | 0 | 0 | 0 |
|   | Inner Layer | 0 | 0 | 0 | 25 | 25 | 0 |
| H | Outer Layer | 0 | 50 | 0 | 0 | 0 | 0 |
|   | Inner Layer | 0 | 0 | 0 | 0 | 50 | 0 |
| I | Outer Layer | 26.5 | 0 | 0 | 0 | 0 | 0.50 |
|   | Middle Layer | 0 | 15 | 1 | 15 | 15 | 0 |
|   | Inner Layer | 27 | 0 | 0 | 0 | 0 | 0 |

[1] development grade by BRASKEM
[2] WM054 by WELLMARK
[3] SGE7252 by BRASKEM
[4] LDPE PCR by ENVISION
[5] HDPE PCR by ENVISION
[6] OM51687650 by CLARIANT The colorant masterbatch in the above table can be substituted with any colorant masterbatch described herein or known to one skilled in the art.

Example 5

The following examples are representative of suitable compositions to form the polyethylene and polypropylene labels of the invention. In some preferred embodiments, the ink is derived from a renewable resource, as previously described herein.

| | Layers | Bio-PE[1] (wt. %) | Recycled PE[2] (wt. %) | Bio-PP[3] (wt. %) | Recycled PP[4] (wt. %) | Paper (wt. %) | Ink (wt. %) |
|---|---|---|---|---|---|---|---|
| A | Single Layer | 99 | 0 | 0 | 0 | 0 | 1 |
| B | Single Layer | 64 | 35 | 0 | 0 | 0 | 1 |

-continued

| Layers | Bio-PE[1] (wt. %) | Recycled PE[2] (wt. %) | Bio-PP[3] (wt. %) | Recycled PP[4] (wt. %) | Paper (wt. %) | Ink (wt. %) |
|---|---|---|---|---|---|---|
| C Single Layer | 59 | 40 | 0 | 0 | 0 | 1 |
| D Single Layer | 0 | 99 | 0 | 0 | 0 | 1 |
| E Single Layer | 0 | 0 | 99 | 0 | 0 | 1 |
| F Single Layer | 0 | 0 | 64 | 35 | 0 | 1 |
| G Single Layer | 0 | 0 | 59 | 40 | 0 | 1 |
| H Single Layer | 0 | 0 | 0 | 99 | 0 | 1 |
| I Single Layer | 0 | 0 | 0 | 0 | 99 | 1 |

[1] development grade by BRASKEM
[2] 101-150 by KW/PCA
[3] development grade by BRASKEM
[4] WM054 by WELLMARK Example 6

The following examples are representative of suitable compositions to form the polyethylene terephthalate labels of the invention. In some preferred embodiments, the ink is derived from a renewable resource, as previously described herein.

| Layers | Bio-PET (wt. %) | Recycled PET[1] (wt. %) | Paper (wt. %) | Ink (wt. %) |
|---|---|---|---|---|
| A Single Layer | 99 | 0 | 0 | 1 |
| B Single Layer | 69 | 30 | 0 | 1 |
| C Single Layer | 30 | 69 | 0 | 1 |

[1] LNO c rPET by PHOENIX TECHNOLOGIES, rPET by EVERGREEN, CT-1500 by CLEAN TECH, or NPL by PHOENIX TECHNOLOGIES

The labels of the invention can be characterized by the methods and specifications previously described.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A sustainable, recyclable, two-year shelf life article substantially free of virgin petroleum-based compounds, the article comprising:
   (a) a container comprising:
      (i) at least about 10 wt. % of high density polyethylene (HDPE) having a biobased content of at least about 95%; and,
      (ii) a polymer selected from the group consisting of post-consumer recycled polyethylene (PCR-PE), post-industrial recycled polyethylene (PIR-PE), regrind polyethylene, and a mixture thereof;
   (b) a cap comprising:
      (i) a polymer selected from the group consisting of polypropylene having a biobased content of at least about 90%, post-consumer recycled polypropylene (PCR-PP), post-industrial recycled polypropylene (PIR-PP), and a mixture thereof; or,
      (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and,
   (c) a label comprising ink and a substrate comprising:
      (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or
      (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or
      (iii) a polymer selected from the group consisting of polypropylene having a biobased content of at least about 90%, post-consumer recycled polypropylene (PCR-PP), post-industrial recycled polypropylene (PIR-PP), paper, and a mixture thereof;
   wherein the container, cap, PE label, and PP label each exhibit a density of less than about 1 g/mL, and the label comprising PET, a polyester of furan dicarboxylic acid, or mixture thereof exhibits a density of greater than about 1 g/mL.

2. The article of claim 1, wherein the container satisfies at least one of the following expedients:
   (i) exhibits a water vapor transmission rate (WVTR) of less than about 0.3 grams per 100 square inches per 1 day (g/100 in$^2$/day), as determined by ASTM 1249-06;

(ii) survives a 4.5 kilogram load at 60° C. for at least about 15 days, according to Environmental Stress cracking (ESC) method ASTM D-2561; and, (iii) exhibits an empty compression strength peak force of no less than about 50 N at a deflection of no more than about 5 mm when empty, uncapped, and air vented, tested at a velocity of about 50 mm/min; or a filled compression strength peak force of no less than about 150 N at a deflection of no more than about 5 mm, tested at a velocity of 12.5 mm/min, and filled with water at a temperature of about 28° C. to about 42° C., when subjected to column crush test ASTM D-2659.

3. The article of claim 1, wherein the HDPE and polymer comprising the container satisfy at least one of the following expedients:

(i) exhibits a heat distortion temperature (HDT) of at least about 40° C., according to method A of ISO 75, and at least about 73° C., according to method B of ISO 75; or a Vicat softening point of at least about 112° C., according to method A50 of ISO 306, and at least about 75° C., according to method B50 of ISO 306; and, (ii) survives an applied stress of about 4.4 MPa for at least about 4 hours, according to the Full Notch Creep test (FNCT) method ISO16770.

4. A sustainable, recyclable, two-year shelf life article substantially free of virgin petroleum-based compounds, the article comprising:

(a) a container comprising:

(i) at least about 10 wt. % of polyethylene terephthalate (PET) or a polyester of furan dicarboxylic acid, each having a biobased content of at least about 90%, based on the total weight of the container; and, (ii) a polymer selected from the group consisting of post-consumer recycled polyethylene terephthalate (PCR-PET), post-industrial recycled polyethylene terephthalate (PIR-PET), regrind polyethylene terephthalate, and a mixture thereof; or a polymer selected from the group consisting of a post-consumer recycled polyester of furan dicarboxylic acid, a post-industrial recycled polyester of furan dicarboxylic acid, a regrind polyester of furan dicarboxylic acid, and a mixture thereof;

with the proviso that (i) and (ii) are either both PET or both a polyester of furan dicarboxylic acid;

(b) a cap comprising:

(i) a polymer selected from the group consisting of polypropylene having a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising:

(i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or, (iii) a polymer selected from the group consisting of polypropylene having a biobased content of at least about 90%, post-consumer recycled polypropylene (PCR-PP), post-industrial recycled polypropylene (PIR-PP), paper, and a mixture thereof;

wherein the cap, PE label, and PP label each exhibit a density of less than about 1 g/mL, and the container and label comprising PET, a polyester of furan dicarboxylic acid, or mixture thereof each exhibit a density of greater than 1 g/mL.

5. The article of claim 4, wherein the container satisfies at least one of the following expedients:

(i) exhibits a water vapor transmission rate (WVTR) of less than about 2.5 grams per 100 square inches per 1 day (g/100 in$^2$/day), as determined by ASTM 1249-06;

(ii) survives a 4.5 kilogram load at 60° C. for at least about 15 days, according to Environmental Stress cracking (ESC) method ASTM D-2561; and, (iii) exhibits an empty compression strength peak force of no less than about 50 N at a deflection of no more than about 5 mm when empty, uncapped, and air vented, tested at a velocity of about 50 mm/min; or a filled compression strength peak force of no less than about 150 N at a deflection of no more than about 5 mm, tested at a velocity of 12.5 mm/min, and filled with water at a temperature of about 28° C. to about 42° C., when subjected to column crush test ASTM D-2659.

6. The article of claim 4, wherein the PET or polyester of furan dicarboxylic acid and polymer comprising the container exhibits a heat distortion temperature (HDT) of at least about 61.1° C., according to method A of ISO 75, and at least about 66.2° C., according to method B of ISO 75; or a Vicat softening point of at least about 79° C., according to method A50 of ISO 306, and at least about 75° C., according to method B50 of ISO 306.

7. A sustainable, recyclable, two-year shelf life article substantially free of virgin petroleum-based compounds, the article comprising:

(a) a container comprising:

(i) at least about 10 wt. % of polypropylene (PP) having a biobased content of at least about 90%, based on the total weight of the container; and, (ii) a polymer selected from the group consisting of post-consumer recycled polypropylene (PCR-PP), post-industrial recycled polypropylene (PIR-PP), regrind polypropylene, and a mixture thereof;

(b) a cap comprising:

(i) a polymer selected from the group consisting of polypropylene having a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE, and a mixture thereof; and, (c) a label comprising ink and a substrate comprising:
(i) a polymer selected from the group consisting of polyethylene having a biobased content of at least about 90%, post-consumer recycled polyethylene (PCR-PE), post-industrial recycled polyethylene (PIR-PE), paper, and a mixture thereof; or,
(ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or,
(iii) a polymer selected from the group consisting of polypropylene having a biobased content of at least about 90%, post-consumer recycled polypropylene (PCR-PP), post-industrial recycled polypropylene (PIR-PP), paper, and a mixture thereof;

wherein the container, cap, PE label, and PP label each exhibit a density of less than about 1 g/mL, and the label comprising PET, a polyester of furan dicarboxylic acid, or mixture thereof exhibits a density of greater than about 1 g/mL.

8. The article of claim 7, wherein the container further comprises about 2 wt. % to about 20 wt. % of an impact modifier, based on the total weight of the container.

9. The article of any one of claims 1, 4, and 7, wherein the cap further comprises up to about 75 wt. % of regrind polypropylene, regrind polyethylene, or a mixture thereof, based on the total weight of the cap.

10. The article of any one of claims 1, 4, and 7, wherein the PCR-PP, PIR-PP, or mixture thereof of the cap further comprise about 0.1 wt. % to about 60 wt. % of elastomer, based on the total weight of the cap.

11. The article of claim 1 or 7, wherein the PE container, PP container, PE cap, PP cap, PE label, PP label, or a mixture thereof further comprises less than about 70 wt. % of a biodegradable polymer, based on the total weight of the container, cap, or label.

12. The article of any one of claims 1, 4 and 7, wherein the container, cap, label, or mixture thereof further comprises a colorant masterbatch.

13. The article of any one of claims 1, 4 and 7, wherein the container, cap, or combination thereof optionally comprise about 1 wt. % to about 50 wt. % of a filler selected from the group consisting of a starch, a fiber, an inorganic material, a foaming agent, a microsphere, a biodegradable polymer, a renewable, but non-biodegradable polymer, and a mixture thereof, based on the total weight of the container or cap.

14. The article of any one of claims 1, 4 and 7, wherein the container, cap, label, or mixture thereof comprise a single layer or a multilayer.

15. The article of claim 14, wherein a multilayer comprises a barrier layer.

16. The article of claim 7, wherein the container satisfies at least one of the following expedients:
(i) exhibits a water vapor transmission rate (WVTR) of less than about 0.6 grams per 100 square inches per 1 day (g/100 in$^2$/day), as determined by ASTM 1249-06;
(ii) survives a 4.5 kilogram load at 60° C. for at least about 15 days, according to Environmental Stress cracking (ESC) method ASTM D-2561; and,
(iii) exhibits an empty compression strength peak force of no less than about 50 N at a deflection of no more than about 5 mm when empty, uncapped, and air vented, tested at a velocity of about 50 mm/min; or a filled compression strength peak force of no less than about 150 N at a deflection of no more than about 5 mm, tested at a velocity of 12.5 mm/min, and filled with water at a temperature of about 28° C. to about 42° C., when subjected to column crush test ASTM D-2659.

17. The article of claim 7, wherein the PP and polymer comprising the container satisfy at least one of the following expedients:
(i) exhibits a heat distortion temperature (HDT) of at least about 57° C., according to method A of ISO 75, and at least about 75° C., according to method B of ISO 75; or a Vicat softening point of at least about 125° C., according to method A50 of ISO 306, and at least about 75° C., according to method B50 of ISO 306; and,
(ii) survives an applied stress of about 4.4 MPa for at least about 4 hours, according to the Full Notch Creep test (FNCT) method ISO16770.

18. The article of any one of claims 1, 4 and 7, wherein the cap satisfies at least one of the following expedients:
(i) sustains at least about 150 openings by a person or at least about 1500 openings by a machine;
(ii) survives a 4.5 kilogram load at 50° C. for about 15 days; and,
(iii) survives a side panel drop, a horizontal drop, and an upside-down drop from a height of at least about 1.2 m, and a vertical bottom drop from a height of at least about 1.5 m.

19. The article of any one of claims 1, 4 and 7, wherein the polymer comprising the cap satisfies at least one of the following expedients:
(i) exhibits less than about 1% reduction in modulus when immersed in water according to ASTM D-638; and,
(ii) exhibits a Vicat softening point of at least about 75° C. according to method A50 of ISO 306; or a Vicat softening point of at least about 50° C. according to method B50 of ISO 306.

20. The article of any one of claims 1, 4 and 7, wherein label satisfies at least one of the following expedients:
(i) exhibits no change after submerging the article in a 38° C. water bath for one hour and squeezing the article 100 times;
(ii) exhibits no change after a product is dropped onto to it at about 20° C. to about 24° C. and then wiped off after about 24 h; and,
(iii) exhibits less than about 2% shrinkage 24 hours after its manufacture.

21. The article of any one of claims 1, 4, and 7, wherein the biobased content of the HDPE is at least about 97%.

22. The article of any one of claims 1, 4, and 7, wherein the biobased content of the PP, LLDPE, LDPE, PE, PET or furan dicarboxylic acid is at least about 93%.

23. The article of any one of claims 1, 4, and 7, wherein the ink is soy-based, plant-based, or a mixture thereof.

24. The article of any one of claims 1, 4, and 7, wherein the label further comprises an adhesive.

25. The article of claim 11, wherein the biodegradable polymer is selected from the group consisting of polylactic acid (PLA), polyglycolic acid (PGA), polybutylene succinate (PBS), an aliphatic-aromatic copolyester based on terephthalic acid, an aromatic copolyester with a high terephthalic acid content, polyhydroxyalkanoate (PHA), thermoplastic starch (TPS), cellulose, and a mixture thereof.

26. The article of claim 12, wherein the colorant masterbatch comprises a carrier selected from the group consisting of a biobased plastic, a petroleum-based plastic, a biobased oil, a petroleum-based oil, or a mixture thereof.

27. The article of claim 12, wherein the colorant masterbatch comprises a pigment selected from the group consisting of an inorganic pigment, an organic pigment, a polymeric resin, and a mixture thereof.

28. The article of claim 12, wherein the colorant masterbatch comprises an additive.

29. The article of claim 13, wherein the filler is calcium carbonate.

30. The article of claim 14, wherein the multilayer is a bilayer, a trilayer, a quadruple layer, or a quintuple layer.

31. The article of claim 30, wherein the bilayer has a weight ratio of outer layer to inner layer of about 99:1 to about 1:99.

32. The article of claim 31, wherein the ratio of the outer layer to the inner layer is about 10:90 to about 30:70.

33. The article of claim 30, wherein the trilayer has a weight ratio of outer layer to middle layer to inner layer of about 20:60:20.

34. The article of claim 30, wherein a middle layer comprises a biodegradable polymer.

35. The article of claim 34, wherein the biodegradable polymer is selected from the group consisting of polylactic acid (PLA), polyglycolic acid (PGA), polybutylene succinate (PBS), an aliphatic-aromatic copolyester based on terephthalic acid, an aromatic copolyester with a high terephthalic acid content, polyhydroxyalkanoate (PHA), thermoplastic starch (TPS), cellulose, and a mixture thereof.

\* \* \* \* \*

(12) INTER PARTES REEXAMINATION CERTIFICATE (870th)
United States Patent
Boswell et al.

(10) Number: US 8,083,064 C1
(45) Certificate Issued: May 6, 2014

(54) SUSTAINABLE PACKAGING FOR CONSUMER PRODUCTS

(75) Inventors: Emily Charlotte Boswell, Cincinnati, OH (US); Dimitris Ioannis Collias, Mason, OH (US); Robert Earl Magness, Lebanon, OH (US); Dean Arthur Zimmerman, West Chester, OH (US); John Moncrief Layman, Liberty Township, OH (US); John Andrew McDaniel, Middletown, OH (US); Holly Balasubramanian Rauckhorst, Fort Thomas, KY (US); Andrew Benjamin Watson, West Chester, OH (US); Anthony James Burns, Liberty Township, OH (US); Brandon Matthew Dunphy, Cincinnati, OH (US); Andrew Eric Neltner, Loveland, OH (US)

(73) Assignee: The Procter & Gamble Company, Cincinnati, OH (US)

Reexamination Request:
No. 95/002,417, Sep. 15, 2012

Reexamination Certificate for:
Patent No.: 8,083,064
Issued: Dec. 27, 2011
Appl. No.: 13/013,302
Filed: Jan. 25, 2011

(51) Int. Cl.
*B65D 85/00* (2006.01)
*B65D 85/84* (2006.01)
*B65D 65/38* (2006.01)

(52) U.S. Cl.
CPC .............. *B65D 85/00* (2013.01); *B65D 65/38* (2013.01); *B65D 2565/384* (2013.01); *B65D 2203/02* (2013.01)
USPC ...................................... 206/524.1; 428/35.7

(58) Field of Classification Search
None
See application file for complete search history.

(56) References Cited

To view the complete listing of prior art documents cited during the proceeding for Reexamination Control Number 95/002,417, please refer to the USPTO's public Patent Application Information Retrieval (PAIR) system under the Display References tab.

*Primary Examiner* — Timothy J Kugel

(57) ABSTRACT

Disclosed herein is a sustainable article substantially free of virgin petroleum-based compounds that includes a container, a cap, and a label, each made from renewable and/or recycled materials. The article has a shelf life of at least two years, and is itself entirely recyclable. The container can include polyethylene, polyethylene terephthalate, or polypropylene. The cap can include polypropylene or polyethylene. The label can include polyethylene, polyethylene terephthalate, polypropylene, or paper.

US 8,083,064 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-6 are cancelled.

Claims 9-14, 18-24 are determined to be patentable as amended.

Claims 15 and 25-35, dependent on an amended claim, are determined to be patentable.

New claims 36, 37 and 38-47 are added and determined to be patentable.

Claims 7, 8, 16 and 17 were not reexamined.

9. The article of [any one of claims 1, 4, and] *claim 7*, wherein the cap further comprises up to about 75 wt. % of regrind polypropylene, regrind polyethylene, or a mixture thereof, based on the total weight of the cap.

10. The article of [any one of claims 1, 4, and] *claim 7*, wherein the PCR-PP, PIR-PP, or mixture thereof of the cap further comprise about 0.1 wt. % to about 60 wt. % of elastomer, based on the total weight of the cap.

11. The article of claim [1 or] *7*, wherein the PE container, PP container, PE cap, PP cap, PE label, PP label, or a mixture thereof further comprises less than about 70 wt. % of a biodegradable polymer, based on the total weight of the container, cap, or label.

12. The article of [any of claims 1, 4 and] *claim 7*, wherein the container, cap, label, or a mixture thereof further comprises a color masterbatch.

13. The article of [any one of claims 1, 4, and] *claim 7*, wherein the container, cap, or combination thereof optionally comprise about 1 wt. % to about 50 wt. % of a filler selected from the group consisting of a starch, a fiber, an inorganic material, a foaming agent, a microsphere, a biodegradable polymer, a renewable, but non-biodegradable polymer, and a mixture thereof, based on the total weight of the container or cap.

14. The article of [any one of claims 1, 4, and] *claim 7*, wherein the container, cap, label, or mixture thereof comprise a single layer or a multilayer.

18. The article of [any one of claims 1, 4, and] *claim 7*, wherein the cap satisfies at least one of the following expedients:
 (i) sustains at least about 150 openings by a person or at least about 1500 openings by a machine;
 (ii) survives a 4.5 kilogram load at 50° C. for about 15 days; and,
 (iii) survives a side panel drop, a horizontal drop, and an upside-down drop from a height of at least about 1.2 m, and a vertical bottom drop from a height of at least about 1.5 m.

19. The article of [any one of claims 1, 4, and] *claim 7*, wherein the polymer comprising the cap satisfies at least one of the following expedients:
 (i) exhibits less than about 1% reduction in modulus when immersed in water according to ASTM D-638; and,
 (ii) exhibits a Vicat softening point of at least about 75° C. according to method A50 of ISO 306; or a Vicat softening point of at least about 50° C. according to method B50 of ISO 306.

20. The article of [any one of claims 1, 4, and] *claim 7*, wherein the label satisfies at least one of the following expedients:
 (i) exhibits no change after submerging the article in a 38° C. water bath for one hour and squeezing the article 100 times;
 (ii) exhibits no change after a product is dropped onto to it at about 20° C. to about 24° C. and then wiped off after about 24 h; and,
 (iii) exhibits less than about 2% shrinkage 24 hours after its manufacture.

21. The article of [any one of claims 1, 4, and] *claim 7*, wherein the biobased content of the HDPE is at least about 97%.

22. The article of [any one of claims 1, 4, and] *claim 7*, wherein the biobased content of the PP, LLDPE, LDPE, PE, PET or furan dicarboxylic acid is at least about 93%.

23. The article of [any one of claims 1, 4, and] *claim 7*, wherein the ink is soy-based, plant-based, or a mixture thereof.

24. The article of [any one of claims 1, 4, and] *claim 7*, wherein the label further comprises an adhesive.

*36. A sustainable, recyclable, two-year shelf life article substantially free of virgin petroleum-based compounds, the article comprising: (a) a container comprising: (i) at least about 10 wt. % of high density polyethylene (HDPE) having a biobased content of at least about 95%; and, (ii) a polymer selected from the group consisting of post-consumer recycled polyethylene (PCR-PE), post-industrial recycled polyethylene (PIR-PE), regrind polyethylene, and a mixture thereof; (b) a cap comprising: (i) a polymer selected from the group consisting of polypropylene having a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising: (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or (iii) a polymer selected from the group consisting of polypropylene having a biobased content of at least about 90%, post-consumer recycled polypropylene (PCR-PP), post-industrial recycled polypropylene (PIR-PP),* paper, and a mixture thereof; wherein the container, cap, PE label, and PP label each exhibit a density of less than about 1 g/mL, and the label comprising PET, a polyester of furan dicarboxylic acid, or mixture thereof exhibits a density of greater than about 1 g/mL; and wherein one of the following expedients are satisfied:
  (i) the container exhibits a water vapor transmission rate (WVTR) of less than about 0.3 grams per 100 square inches per 1 day (g/100 in2/day), as determined by ASTM 1249-06;
  (ii) the container survives a 4.5 kilogram load at 60° C. for at least about 15 days, according to Environmental Stress cracking (ESC) method ASTM D-2561;
  (iii) the container exhibits an empty compression strength peak force of no less than about 50 N at a deflection of no more than about 5 mm when empty, uncapped, and air vented, tested at a velocity of about 50 mm/min; or a filled compression strength peak force of no less than about 150 N at a deflection of no more than about 5 mm, tested at a velocity of 12.5 mm/min, and filled with water at a temperature of about 28° C. to about 42° C., when subjected to column crush test ASTM D-2659;
  (iv) the HDPE and polymer comprising the container exhibit a heat distortion temperature (HDT) of at least about 40° C., according to method A of ISO 75, and at least about 73° C., according to method B of ISO 75; or a Vicat softening point of at least about 112° C., according to method A50 or ISO 306, and at least about 75° C., according to method B50 of ISO 36; and,
  (v) the HDPE and polymer comprising the container survive an applied stress of about 4.4 MPa for at least about 4 hours, according to the Full Notch Creep test (FNCT) method ISO 16770; and
wherein the cap comprises a mixture of PCR-PP and PIR-PP, and is free of biobased polypropylene.

37. A sustainable, recyclable, two-year shelf life article substantially free of virgin petroleum-based compounds, the article comprising: (a) a container comprising: (i) at least about 10 wt. % of polyethylene terephthalate (PET) or a polyester of furan dicarboxylic acid, each having a biobased content of at least about 90%, based on the total weight of the container; and, (ii) a polymer selected from the group consisting of post-consumer recycled polyethylene terephthalate (PCR-PET), post-industrial recycled polyethylene terephthalate (PIR-PET), regrind polyethylene terephthalate, and a mixture thereof; or a polymer selected from the group consisting of a post-consumer recycled polyester of furan dicarboxylic acid, a post-industrial recycled polyester of furan dicarboxylic acid, a regrind polyester of furan dicarboxylic acid, and a mixture thereof; with the proviso that (i) and (ii) are either both PET or both a polyester of furan dicarboxylic acid; (b) a cap comprising: (i) a polymer selected from the group consisting of polypropylene haying a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising: (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or, (iii) a polymer selected from the group consisting of polypropylene having a biobased content of at least about 90%, post-consumer recycled polypropylene (PCR-PP), post-industrial recycled polypropylene (PIR-PP), paper, and a mixture thereof; wherein the cap, PE label, and PP label each exhibit a density of less than about 1 g/mL, and the container and label comprising PET, a polyester of furan dicarboxylic acid, or mixture thereof each exhibit a density of greater than 1 g/mL, and wherein the container, cap, label, or a mixture thereof comprises a multilayer and the multilayer comprises a barrier layer; and wherein the cap comprises a mixture of PCR-PP and PIR-PP, and is free of biobased PP.

38. A sustainable, recyclable, two-year shelf life article substantially free of virgin petroleum-based compounds, the article comprising: (a) a container comprising: (i) at least about 10 wt. % of high density polyethylene (HDPE) having a biobased content of at least about 95%; and, (ii) a polymer selected from the group consisting of post-consumer recycled polyethylene (PCR-PE), post-industrial recycled polyethylene (PIR-PE), regrind polyethylene, and a mixture thereof; (b) a cap comprising: (i) a polymer selected from the group consisting of polypropylene having a biobased content of at least about 90%, post-consumer recycled polypropylene (PCR-PP) post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising: (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or (iii) a polymer selected from the group consisting of polypropylene having a biobased content of at least about 90%, post-consumer recycled polypropylene (PCR-PP), post-industrial recycled polypropylene (PIR-PP), paper, and a mixture thereof; wherein the container, cap, PE label, and PP label each exhibit a density of less than about 1 g/mL, and the label comprising PET, a polyester of furan dicarboxylic acid, or mixture thereof exhibits a density of greater than about 1 g/mL; and wherein one of the following expedients are satisfied:
  (i) the container exhibits a water vapor transmission rate (WVTR) of less than about 0.3 grams per 100 square inches per 1 day (g/100 in² /day), as determined by ASTM 1249-06;
  (ii) the container survives a 4.5 kilogram load at 60° C. for at least about 15 days, according to Environmental Stress cracking (ESC) method ASTM D-2561;
  (iii) the container exhibits an empty compression strength peak force of no less than about 50 N at a deflection of no more than about 5 mm when empty, uncapped, and air vented, tested at a velocity of about 50 mm/min; or a filled compression strength peak force of no less than about 150 N at a deflection of no more than about 5 mm, tested at a velocity of 12.5 mm/min, and filled with water at a temperature of about 28° C. to about 42° C., when subjected to column crush test ASTM D-2659;
  (iv) the HDPE and polymer comprising the container exhibit a heat distortion temperature (HDT) of at least about 40° C., according to method A of ISO 75, and at least about 73° C., according to method B of ISO 75; or a Vicat softening point of at least about 112° C., according to method A50 or ISO 306, and at least about 75° C., according to method B50 of ISO 36; and,
  (v) the HDPE and polymer comprising the container survive an applied stress of about 4.4 MPa for at least about 4 hours, according to the Full Notch Creep test (FNCT) method ISO 16770; and
wherein the container, cap, label, or a mixture thereof further comprises a color masterbatch.

39. A sustainable, recyclable, two-year shelf life article substantially free of virgin petroleum-based compounds, the article comprising: (a) a container comprising: (i) at least about 10 wt. % of polyethylene terephthalate (PET) or a polyester of furan dicarboxylic acid, each having a biobased content of at least about 90%, based on the total weight of the container; and, (ii) a polymer selected from the group consisting of post-consumer recycled polyethylene terephthalate (PCR-PET), post-industrial recycled polyethylene terephthalate (PIR-PET), regrind polyethylene terephthalate, and a mixture thereof; or a polymer selected from the group consisting of a post-consumer recycled polyester of furan dicarboxylic acid, a post-industrial recycled polyester of furan dicarboxylic acid, a regrind polyester of furan dicarboxylic acid, and a mixture thereof; with the proviso that (i) and (ii) are either both PET or both a polyester of furan dicarboxylic acid; (b) a cap comprising: (i) a polymer selected from the group consisting of polypropylene having a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising: (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or, (iii) a polymer selected from the group consisting of polypropylene having a biobased content of at least about 90%, post-consumer recycled polypropylene (PCR-PP), post-industrial recycled polypropylene (PIR-PP), paper, and a mixture thereof; wherein the cap, PE label, and PP label each exhibit a density of less than about 1 g/mL, and the container and label comprising PET, a polyester of furan dicarboxylic acid, or mixture thereof each exhibit a density of greater than 1 g/mL, and wherein the container, cap, label, or a mixture thereof comprises a multilayer and the multilayer comprises a barrier layer; and wherein the container, cap, label, or a mixture thereof further comprises a color masterbatch.

40. A sustainable, recyclable, two-year shelf life article substantially free of virgin petroleum-based compounds, the article comprising: (a) a container comprising: (i) at least about 10 wt. % of high density polyethylene (HDPE) haying a biobased content of at least about 95%; and, (ii) a polymer selected from the group consisting of post-consumer recycled polyethylene (PCR-PE), post-industrial recycled polyethylene (PIR-PE), regrind polyethylene, and a mixture thereof; (b) a cap comprising: (i) a polymer selected from the group consisting of polypropylene having a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising: (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or (iii) a polymer selected from the group consisting of polypropylene having a biobased content of at least about 90%, post-consumer recycled polypropylene (PCR-PP), post-industrial recycled polypropylene (PIR-PP), paper, and a mixture thereof; wherein the container, cap, PE label, and PP label each exhibit a density of less than about 1 g/mL, and the label comprising PET, a polyester of furan dicarboxylic acid, or mixture thereof exhibits a density of greater than about 1 g/mL; and wherein one of the following expedients are satisfied:

(i) the container exhibits a water vapor transmission rate (WVTR) of less than about 0.3 grams per 100 square inches per 1 day (g/100 in$^2$/day), as determined by ASTM 1249-06;

(ii) the container survives a 4.5 kilogram load at 60° C. for at least about 15 days, according to Environmental Stress cracking (ESC) method ASTM D-2561;

(iii) the container exhibits an empty compression strength peak force of no less than about 50 N at a deflection of no more than about 5 mm when empty, uncapped, and air vented, tested at a velocity of about 50 mm/min; or a filled compression strength peak force of no less than about 150 N at a deflection of no more than about 5 mm, tested at a velocity of 12.5 mm/min, and filled with water at a temperature of about 28° C. to about 42° C., when subjected to column crush test ASTM D-2659;

(iv) the HDPE and polymer comprising the container exhibit a heat distortion temperature (HDT) of at least about 40° C., according to method A of ISO 75, and at least about 73° C., according to method B of ISO 75; or a Vicat softening point of at least about 112° C., according to method A50 or ISO 306, and at least about 75° C., according to method B50 of ISO 36; and, (v) the HDPE and polymer comprising the container survive an applied stress of about 4.4 MPa for at least about 4 hours, according to the Full Notch Creep test (FNCT) method ISO 16770; and wherein the ink is soy-based, plant-based, or a mixture thereof.

41. A sustainable, recyclable, two-year shelf life article substantially free of virgin petroleum-based compounds, the article comprising: (a) a container comprising: (i) at least about 10 wt. % of polyethylene terephthalate (PET) or a polyester of furan dicarboxylic acid, each having a biobased content of at least about 90%, based on the total weight of the container; and, (ii) a polymer selected from the group consisting of post-consumer recycled polyethylene terephthalate (PCR-PET), post-industrial recycled polyethylene terephthalate (PIR-PET), regrind polyethylene terephthalate, and a mixture thereof; or a polymer selected from the group consisting of a post-consumer recycled polyester of furan dicarboxylic acid, a post-industrial recycled polyester of furan dicarboxylic acid, a regrind polyester of furan dicarboxylic acid, and a mixture thereof; with the proviso that (i) and (ii) are either both PET or both a polyester of furan dicarboxylic acid; (b) a cap comprising: (i) a polymer selected from the group consisting of polypropylene having a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising: (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or, (iii) a polymer selected from the group consisting of polypropylene having a biobased content of at least about 90%, post-consumer recycled polypropylene (PCR-PP), post-industrial recycled polypropylene (PIR-PP), paper, and a mixture thereof; wherein the cap, PE label, and PP label each exhibit a density of less than about 1 g/mL, and the container and label comprising PET, a polyester of furan dicarboxylic acid, or mixture thereof each exhibit a density of greater than 1 g/mL, and wherein the container, cap, label, or a mixture thereof comprises a multilayer and the multilayer comprises a barrier layer; and wherein the ink is soy-based, plant-based, or a mixture thereof.

42. The article of claim 38 or claim 39, wherein the colorant masterbatch comprises a carrier selected from the group consisting of a biobased plastic, a petroleum-based plastic, a biobased oil, a petroleum-based oil, or a mixture thereof.

43. The article of claim 38 or claim 39, wherein the colorant masterbatch comprises a pigment selected from the group consisting of an inorganic pigment, an organic pigment, a polymeric resin, and a mixture thereof.

44. The article of claim 38 or claim 39, wherein the colorant masterbatch comprises an additive.

45. A sustainable, recyclable, two-year shelf life article substantially free of virgin petroleum-based compounds, the article comprising: (a) a container comprising: (i) at least about 10 wt. % of high density polyethylene (HDPE) having a biobased content of at least about 95%; and, (ii) a polymer selected from the group consisting of post-consumer recycled polyethylene (PCR-PE), post-industrial recycled polyethylene (PIR-PE), regrind polyethylene, and a mixture thereof; (b) a cap comprising: (i) a polymer selected from the group consisting of polypropylene having a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising: (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or (iii) a polymer selected from the group consisting of polypropylene having a biobased content of at least about 90%, post-consumer recycled polypropylene (PCR-PP), post-industrial recycled polypropylene (PIR-PP), paper, and a mixture thereof; wherein the container, cap, PE label, and PP label each exhibit a density of less than about 1 g/mL, and the label comprising PET, a polyester of furan dicarboxylic acid, or mixture thereof exhibits a density of greater than about 1 g/mL; and wherein one of the following expedients are satisfied:
  (i) the container exhibits a water vapor transmission rate (WVTR) of less than about 0.3 grams per 100 square inches per 1 day (g/100 in$^2$/day), as determined by ASTM 1249-06;
  (ii) the container survives a 4.5 kilogram load at 60° C. for at least about 15 days, according to Environmental Stress cracking (ESC) method ASTM D-2561;
  (iii) the container exhibits an empty compression strength peak force of no less than about 50 N at a deflection of no more than about 5 mm when empty, uncapped, and air vented, tested at a velocity of about 50 mm/min; or a filled compression strength peak force of no less than about 150 N at a deflection of no more than about 5 mm, tested at a velocity of 12.5 mm/min, and filled with water at a temperature of about 28° C. to about 42° C., when subjected to column crush test ASTM D-2659;
  (iv) the HDPE and polymer comprising the container exhibit a heat distortion temperature (HDT) of at least about 40° C., according to method A of ISO 75, and at least about 73° C., according to method B of ISO 75; or a Vicat softening point of at least about 112° C., according to method A50 or ISO 306, and at least about 75° C., according to method B50 of ISO 36; and,
  (v) the HDPE and polymer comprising the container survive an applied stress of about 4.4 MPa for at least about 4 hours, according to the Full Notch Creep test (FNCT) method ISO 16770; and
wherein the container, cap, label, or mixture thereof comprises multilayer, the multilayer is a bilayer, and wherein the bilayer has a weight ratio of outer layer to inner layer of about 99:1 to about 1:99.

46. The article of claim 45, wherein the ratio of the outer layer to the inner layer is about 10:90 to about 30:70.

47. A sustainable, recyclable, two-year shelf life article substantially free of virgin petroleum-based compounds, the article comprising: (a) a container comprising: (i) at least about 10 wt. % of high density polyethylene (HDPE) having a biobased content of at least about 95%; and, (ii) a polymer selected from the group consisting of post-consumer recycled polyethylene (PCR-PE), post-industrial recycled polyethylene (PIR-PE), regrind polyethylene, and a mixture thereof; (b) a cap comprising: (i) a polymer selected from the group consisting of polypropylene having a biobased content of at least about 90%, post-consumer recycled polypropylene (PCR-PP), post-industrial recycled polypropylene (PIR-PP), and a mixture thereof; or, (ii) a polymer selected from the group consisting of linear low density polyethylene (LLDPE) having a biobased content of at least about 90%, post-consumer recycled LLDPE, post-industrial recycled LLDPE, high density polyethylene (HDPE) having a biobased content of at least about 95%, post-consumer recycled HDPE, post-industrial recycled HDPE, low density polyethylene (LDPE) that has a biobased content of at least about 90%, post-consumer recycled LDPE, post-industrial recycled LDPE; and a mixture thereof; and, (c) a label comprising ink and a substrate comprising: (i) a polymer selected from the group consisting of polyethylene having a biobased content of at least about 90%, post-consumer recycled polyethylene (PCR-PE), post-industrial recycled polyethylene (PIR-PE), paper, and a mixture thereof; or (ii) a polymer selected from the group consisting of polyethylene terephthalate having a biobased content of at least about 90%, post-consumer recycled polyethylene terephthalate (PET), post-industrial recycled PET, regrind PET, a polyester of furan dicarboxylic acid having a biobased content of at least about 90%, a post-consumer recycled polyester of furan dicarboxylic acid, a post-industrial recycled polyester of furan dicarboxylic acid, a regrind polyester of furan dicarboxylic acid, paper, and a mixture thereof; or (iii) a polymer selected from the group consisting of polypropylene having a biobased content of at least about 90%, post-consumer recycled polypropylene (PCR-PP), post-industrial recycled polypropylene (PIR-PP), paper, and a mixture thereof; wherein the container, cap, PE label, and PP label each exhibit a density of less than about 1 g/mL, and the label comprising PET, a polyester of furan dicarboxylic acid, or mixture thereof exhibits a density of greater than about 1 g/mL; and wherein one of the following expedients are satisfied:
  (i) the container exhibits a water vapor transmission rate (WVTR) of less than about 0.3 grams per 100 square inches per 1 day (g/100 in$^2$/day), as determined by ASTM 1249-06;
  (ii) the container survives a 4.5 kilogram load at 60° C. for at least about 15 days, according to Environmental Stress cracking (ESC) method ASTM D-2561;
  (iii) the container exhibits an empty compression strength peak force of no less than about 50 N at a deflection of no more than about 5 mm when empty, uncapped, and air vented, tested at a velocity of about 50 mm/min; or a filled compression strength peak force of no less than about 150 N at a deflection of no more than about 5 mm, tested at a velocity of 12.5 mm/min, and filled with water at a temperature of about 28° C. to about 42° C., when subjected to column crush test ASTM D-2659;
  (iv) the HDPE and polymer comprising the container exhibit a heat distortion temperature (HDT) of at least about 40° C., according to method A of ISO 75, and at least about 73° C., according to method B of ISO 75; or a Vicat softening point of at least about 112° C., according to method A50 or ISO 306, and at least about 75° C., according to method B50 of ISO 36; and,
  (v) the HDPE and polymer comprising the container survive an applied stress of about 4.4 MPa for at least about 4 hours, according to the Full Notch Creep test (FNCT) method ISO 16770; and
wherein the container, cap, label, or mixture thereof comprises multilayer, the multilayer is a trilayer, and wherein the trilayer has a weight ratio of outer layer to middle layer to inner layer of about 20:60:20.

* * * * *